United States Patent
Takao et al.

(10) Patent No.: US 6,936,657 B2
(45) Date of Patent: Aug. 30, 2005

(54) DISPERSION COMPOSITION AND METHOD FOR PRODUCING THE SAME

(75) Inventors: Nagayuki Takao, Ryugasaki (JP); Miyuki Nishimura, Ibaraki-ken (JP)

(73) Assignee: Hitachi Maxell, Ltd., Ibaraki (JP)

( * ) Notice: Subject to any disclaimer, the term of this patent is extended or adjusted under 35 U.S.C. 154(b) by 226 days.

(21) Appl. No.: 10/456,506

(22) Filed: Jun. 9, 2003

(65) Prior Publication Data

US 2003/0212198 A1 Nov. 13, 2003

Related U.S. Application Data

(62) Division of application No. 09/670,838, filed on Sep. 28, 2000, now Pat. No. 6,627,969.

(30) Foreign Application Priority Data

Sep. 28, 1999 (JP) ........................................... 11-274764

(51) Int. Cl.$^7$ ................................................. C08J 3/00
(52) U.S. Cl. ..................... 524/588; 524/267; 523/161; 525/326.1; 525/327.3; 430/114; 430/115; 428/107; 428/402.24
(58) Field of Search ................................ 524/588, 267; 523/161; 525/326.1, 327.3; 430/114, 115; 428/107, 402.24

(56) References Cited

U.S. PATENT DOCUMENTS

| 4,412,039 A | 10/1983 | Alberts et al. ............... 525/106 |
| 4,444,946 A | 4/1984 | Alberts et al. ................. 525/29 |
| 4,663,265 A | * 5/1987 | Uytterhoeven et al. ...... 430/114 |
| 5,254,425 A | * 10/1993 | Suzuki et al. ................ 430/115 |
| 5,952,429 A | * 9/1999 | Ikeda et al. ............... 525/326.1 |

FOREIGN PATENT DOCUMENTS

| GB | 2095264 A | 9/1982 |
| GB | 2218924 A | 11/1989 |
| JP | 10324819 | 12/1988 |
| JP | 2167323 | 6/1990 |
| JP | 2208310 | 8/1990 |
| JP | 3160464 A | 7/1991 |
| JP | 8030040 A | 2/1996 |
| JP | 2001-342388 | * 12/2001 |

* cited by examiner

Primary Examiner—David W. Wu
Assistant Examiner—Henry S. Hu
(74) Attorney, Agent, or Firm—Birch, Stewart, Kolasch & Birch, LLP

(57) ABSTRACT

There is provided a dispersion composition which has excellent dispersion stability and hardly sediments even after a long-term storage. This dispersion composition is a composition comprising a particulate material dispersed in an organic solvent, wherein a graft copolymer which has a particle diameter of 0.01–1 μm and self-disperses in said organic solvent is adsorbed to at least a part of the outer surface of said particulate material and a graft chain of said graft copolymer comprises a polysiloxane and an alkylene group of 1–18 carbon atoms.

4 Claims, No Drawings

DISPERSION COMPOSITION AND METHOD FOR PRODUCING THE SAME

This application is a divisional of application Ser. No. 09/670,838, filed on Sep. 28, 2000 now U.S. Pat. No. 6,627,969, for which priority is claimed under 35 U.S.C. § 120; and this application claims priority of application No. 11-274764 filed in Japan on Sep. 28, 1999 under 35 U.S.C. § 119; the entire contents of these applications are hereby incorporated by reference.

BACKGROUND OF THE INVENTION

The present invention relates to a dispersion composition and a method for producing the same. More particularly, it relates to a dispersion composition which can be utilized in the technical fields where a particulate material insoluble in organic solvent is dispersed and used, for example, the field of paint, printing ink, liquid developer (wet toner) or ink jet ink where a pigment or a dye as a particulate material is dispersed and utilized, the field where a medicine as a particulate material is dispersed and utilized, and the field where a catalyst or a polymerization initiator as a particulate material is dispersed and utilized, and to a method for producing the same. The present invention further relates to a dispersion composition utilizable also in the field of coloring materials comprising a polymeric compound in which a particulate material is included by drying, such as dry toners, powdered paints, and plastics, and to a method for producing the same.

Hitherto, in the field of utilizing pigments or dyes which are particulate materials insoluble in organic solvents, a fine dispersion of particles has been made resulting in improved storage stability. For example, British Patent No. 2001083 discloses the use of a specific polyester amine as a pigment dispersant in paints or inks.

Furthermore, JP-A-8-30040 discloses a liquid developer prepared by dispersing in a non-aqueous solvent an urethane-based microencapsulated colored resin particle containing a pigment or a dye.

Moreover, JP-A-3-160464 discloses a solid self-dispersion type coloring material comprising a mixture of a pigment or a dye and a self-dispersion type graft polymer which forms particles upon self-dispersing in a high insulation carrier liquid, and mentions use of silicone-based graft polymers.

However, in the dispersion compositions using general dispersion stabilizers and pigment dispersants disclosed in the above British Patent No. 2001083, the type of organic solvent or pigment used is limited. Moreover, stabilization of the dispersion has been attempted by steric repulsion of the resins, however since the amount of electric charge generated at the surface of the pigment is small, in the case of dilute pigment dispersion, sedimentation occurs when stored for a long time and thus it lacks dispersion stability.

Furthermore, the solid self-dispersion type coloring material using urethane-based microencapsulated colored resin particles or self-dispersion type graft copolymers have the problem of sedimentation in long-term storage when they are used for liquid developers or ink jet inks because of their large dispersion particle diameter.

Moreover, the polymer toners have a large particle diameter because they are obtained by dispersing a reactive silicone monomer, an isocyanate and a coloring material and then polymerizing them, and the silicone-containing polymer used for the improvement of dispersibility dissolves in the organic solvent in the ink to cause sedimentation of toner particles in the ink.

SUMMARY OF THE INVENTION

Accordingly, the object of the present invention is to provide a dispersion composition which is enhanced in dispersion stability of a particulate material, solves the problem of sedimentation, expands the kind of usable organic solvent or insoluble particulate materials and is wide in use, especially useful for liquid developers or ink jet inks which utilize the electrostatic force.

The above object can be attained by a dispersion composition comprising a particulate material dispersed in an organic solvent where a graft copolymer in which the graft chain comprises a polysiloxane and an alkylene group (hereinafter referred to as "graft copolymer A") is adsorbed to at least a part of the outer surface of said particulate material.

DESCRIPTION OF THE INVENTION

According to the research conducted by the inventors, it has been found that by adsorbing the graft copolymer A to at least a part of the outer surface of a particulate material, the particulate material can be made finer and electric charge can be generated at the surface of the particulate material, whereby steric repulsive force between the particulate materials per se is enhanced, and sedimentation of the particulate material is inhibited and dispersion stability is enhanced.

The graft copolymer A in the present invention is a copolymer of such a type that a branch (graft chain) of a homopolymer grows at a backbone (main chain) of another homopolymer. This graft chain is composed of a polysiloxane and an alkylene group. The polysiloxane means a chain of siloxane bond (—Si—O—). By bonding the polysiloxane through the alkylene group, the portion of polysiloxane is sufficiently extended for an organic solvent, especially, an organic solvent having a resistivity of not less than $10^9$ Ωcm (e.g., aliphatic hydrocarbons or silicone solvents), and the particulate material can be finely and stably kept. Furthermore, since the graft copolymer A is adsorbed to the surface of pigment so as to cover the particulate material, electric charge can be generated.

Moreover, the dispersion composition of the present invention can be produced by mixing a dispersion comprising a particulate material dispersed using a graft copolymer having a particle diameter of 0.01–1 µm in an organic solvent in which said graft copolymer is soluble with an organic solvent in which said graft copolymer is insoluble, thereby precipitating the graft copolymer to adsorb the graft copolymer to at least a part of the outer surface of the particulate material.

In the dispersion composition of the present invention, it is essential that the graft chain bonded to the graft backbone (main chain) in the graft copolymer A adsorbed to the particulate material comprises a polysiloxane and an alkylene group. More preferred is a structure where the polysiloxane is bonded to the main chain through the alkylene group. The structure of the graft chain comprising a polysiloxane and an alkylene group is represented by the following formula.

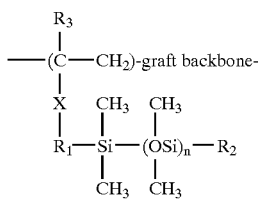

X: A linkage group containing at least one of urethane group, amide group and ester group.
$R_1$: An alkylene group of 1–18 carbon atoms.
$R_2$: An alkyl group of 1–4 carbon atoms.
$R_3$: H or $CH_3$
n: An integer of 5–200.

The alkylene group is not particularly limited as far as the carbon number is 1 or more, but an alkylene group of 1–18 carbon atoms is preferred. An alkylene group of more than 18 carbon atoms is not preferred since the solubility of the graft polymer increases and the self-dispersion becomes difficult. An alkylene group of 1–12 carbon atoms is especially preferred. The polysiloxane is preferably polydimethylsiloxane and the molecular weight thereof is preferably 370–15000. Bonding of the alkylene group in the graft chain to the graft backbone (main chain) is conducted through an ester group, an amide group, an urethane group or the like. The ester group is especially preferred which can be simply obtained.

In the case of the general graft copolymers having a graft chain comprising only a polysiloxane shown in JP-A-6-160464, there is no extension of the graft portion in the organic solvent, and dispersion particle diameter of the particulate material increases and it sediments when used for preparation of jet ink and the like.

In the dispersion composition of the present invention, it is essential that the graft copolymer A adsorbed to the particulate material has a particle diameter of 0.01–1 μm and self-disperses in an organic solvent. If the particle diameter is more than 1 μm, it becomes difficult to improve the dispersion stability of the particulate material, and if it is less than 0.01 μm, the particulate material cannot be covered. More preferred range of the particle diameter is 0.015–0.5 μm, and further preferred is 0.015–0.25 μm. For obtaining the finer and very stable dispersion composition, the particle diameter is preferably 0.015–0.09 μm.

The term "self-disperse" employed in the present specification means that the graft copolymer A does not dissolve in an organic solvent and only the graft copolymer A by itself disperses. For example, it means a phenomenon that after the graft copolymer A is dissolved in an organic solvent which dissolves the graft copolymer A, when this solution is mixed with an organic solvent which does not dissolve the graft copolymer A, the graft copolymer does not form large masses and disperses in the form of particles. The self-dispersion disclosed in JP-A-3-160464 shows one which occurs only by adding a solid graft copolymer to a carrier liquid and this is a phenomenon different from the self-dispersion in the present invention. Moreover, the graft polymer in the present invention which is made solid does not self-disperse only by adding it to a carrier liquid. The average particle diameter of the graft copolymer A can be measured by a general known particle size distribution meter such as a laser type particle size distribution meter or a centrifugal sedimentation type particle size distribution meter.

Furthermore, the graft copolymer A preferably has a polar group for finely dispersing the particulate material and giving electric charge to the particulate material to improve the dispersion stability. The polar groups suitable for such purpose are not limited and include basic groups, acidic groups, hydroxyl group, and the like. Especially, acidic group and hydroxyl group are preferred for finely dispersing the particulate material and for performing crosslinking reaction. As basic groups, there are no special limitations, and mention may be made of primary, secondary, tertiary and quaternary amino groups. As acidic groups, there are no special limitations, and mention may be made of carboxyl group, sulfonic acid group and phosphonic acid group. Carboxyl group of low acid strength is especially preferred since agglomeration of the dispersion composition hardly occurs and from the point of reaction rate of the crosslinking reaction.

Acid value of the graft copolymer A is preferably in the range of 5–200 KOH mg/g. If the acid value is less than 5 KOH mg/g, affinity with the particulate material is weak and fine dispersion composition cannot be obtained or electric charge of the particulate material becomes small. If it exceeds 200 KOH mg/g, acid strength of the graft copolymer A increases and extension of the graft copolymer A in the organic solvent becomes small, and, thus, adsorption to the particulate material becomes difficult.

Hydroxyl value of the graft copolymer A is preferably in the range of 5–200 KOH mg/g. If the hydroxyl value is less than 5 KOH mg/g, affinity with the particulate material is weak and fine dispersion composition cannot be obtained or electric charge of the particulate material becomes small. If it exceeds 200 KOH mg/g, polarity of the graft copolymer A increases and extension of the graft copolymer A in the organic solvent becomes small, and, thus, adsorption to the particulate becomes difficult.

Amine value of the graft copolymer A is preferably in the range of 5–200 KOH mg/g. If the amine value is less than 5 KOH mg/g, affinity with the particulate material is weak and fine dispersion composition cannot be obtained or electric charge of the particulate material becomes small. If it exceeds 200 KOH mg/g, polarity of the graft copolymer A increases and extension of the graft copolymer A in the organic solvent becomes small, and, thus, adsorption to the particulate becomes difficult.

Number-average molecular weight of the graft copolymer A is preferably in the range of 1000–50000. If the number-average molecular weight is less than 1000, it becomes difficult to finely disperse the particulate material, and sedimentation of the particulate material is caused. If it exceeds 50000, dissolution in the solvent becomes difficult to cause increase of viscosity of the dispersion composition. More preferred range is 3000–30000.

Particle size distribution is preferably in the range of 0.01–1.0 μm, and 0.01–0.5 μm is more preferred from the point of sedimentation of the particulate material. Further preferred range is 0.01–0.25 μm. The particle size distribution of the particulate material can be controlled to the range of 0.01–1.0 μm, for example, by the method of dry grinding the particulate material together with grinding medium such as balls by a ball mill, the method of wet grinding the particulate material together with grinding medium such as balls in a solvent by a ball mill, and the method of dissolving the particulate material in a specific solvent and then precipitating it (for example, by dissolving the particulate material in sulfuric acid and thereafter precipitating it with addition of water or by adding the solution to water).

The particulate material to which the graft copolymer A is adsorbed in the dispersion composition of the present invention is not limited, but preferably has an electric charge from the point of dispersion stability. For example, as the electric charge of the particulate material, preferred is not less than 10 mV, more preferred is not less than 15 mV in absolute value of $\zeta$ potential.

The graft copolymer A keeps the adsorptivity to the particulate material and extension of resin into the organic solvent by having such a structure that the main backbone adsorbed to the particulate material and the portion having affinity for the organic solvent are bonded to polysiloxane through the main backbone and alkylene group. There is no problem to use amphoteric polymer compounds having both the acidic group and the basic group.

The method for producing the graft copolymer A is not limited. The graft copolymer A can be obtained by reacting a silicone-based macromonomer comprising polysiloxane and alkylene group for graft chain as an essential component with other polymerizable monomer for main chain in a non-reactive solvent in the presence or absence of a catalyst. Especially preferably, the silicone-based macro-monomer is copolymerized with a monomer having polar group for main chain. Another preferred method comprises synthesizing an acrylic polymer having a reactive group and then reacting it with a reactive silicone to perform grafting. In the production of the graft copolymer A of the present invention, the monomers for main chain may be used alone or in combination of two or more.

In the present invention, as the silicone-based macro-monomers for graft chain comprising polysiloxane and alkylene group, mention may be made of those represented by the following formula:

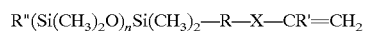

wherein R is an alkylene group of 1–18 carbon atoms, R' is $CH_3$ or H, R" is an alkyl group of 1–4 carbon atoms, n is an integer of 5–200, X is a linkage group containing at least one of urethane group, amido group and ester group.

Specifically, there may be used the following commercially available products manufactured by Shin-Etsu Chemical Co., Ltd.:

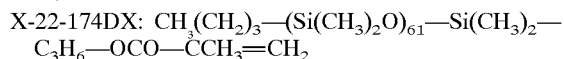

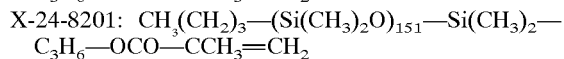

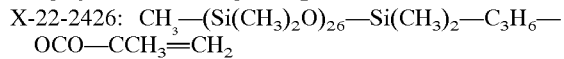

In addition, there may be used $CH_3$—$(Si(CH_3)_2O)_n$—$Si(CH_3)_2$—$C_3H_6$—$CHOH$—$CH_2OCO$—$CCH_3$=$CH_2$, $CH_3$—$(Si(CH_3)_2O)_n$—$Si(CH_3)_2$—$C_3H_6$—$NHCO$—$CCH_3$=$CH_2$, $CH_3$—$(Si(CH_3)_2O)_n$—$Si(CH_3)_2$—$C_3H_6$—$OC_2H_4OCONH(CH_2)_6NHCOOCO$—$CCH_3$=$CH_2$, etc. which are synthesized by the processes known to one skilled in the art.

Among the polar group-containing acrylic monomers used for forming the graft backbone (main chain) of the graft copolymer A, examples of the monomers having an acidic group as the polar group are monomers having carboxyl group such as acrylic acid, methacrylic acid, crotonic acid, ethylacrylic acid, propylacrylic acid, isopropylacrylic acid, itaconic acid, fumaric acid, acryloyloxyethyl phthalate and acryloyloxy succinate; monomers having sulfonic acid group such as acrylic acid ethyl 2-sulfonate, methacrylic acid ethyl 2-sulfonate and butylacrylamido-sulfonic acid; monomers having phosphonic acid group such as methacrylic acid ethyl 2-phosphonate and acrylic acid ethyl 2-phosphonate; and monomers having hydroxyl group such as 2-hydroxyethyl acrylate, 2-hydroxyethyl methacrylate, hydroxypropyl acrylate and hydroxypropyl methacrylate. Preferred are monomers having carboxyl group or hydroxyl group.

Examples of monomers having basic group are monomers having primary amino group such as acrylic acid amide, aminoethyl acrylate, aminopropyl acrylate, methacrylic acid amide, aminoethyl methacrylate and aminopropyl methacrylate; monomers having secondary amino group such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate and ethylaminopropyl methacrylate; monomers having tertiary amino group such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate and diethylaminopropyl methacrylate; and monomers having quaternary amino group such as acrylic acid dimethylaminoethylmethyl chloride, methacrylic acid dimethylaminoethylmethyl chloride, acrylic acid dimethylaminoethylbenzyl chloride and methacrylic acid dimethylaminoethylbenzyl chloride.

As the other polymerizable monomers, mention may be made of, for example, (meth)acrylates such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, benzyl methacrylate, 2-ethylhexyl acrylate, 2-ethylhexyl methacrylate, octyl acrylate, octyl methacrylate, lauryl acrylate, lauryl methacrylate, cetyl acrylate, cetyl methacrylate, stearyl acrylate, stearyl methacrylate, behenyl acrylate and behenyl methacrylate; styrene monomers such as styrene, α-methylstyrene, o-methylstyrene, m-methylstyrene, p-methylstyrene and p-tert-butylstyrene; itaconates such as benzyl itaconate; maleates such as dimethyl maleate; fumarates such as dimethyl fumarate; acrylonitrile, methacrylonitrile, vinyl acetate; hydroxyl group-containing monomers such as 2-hydroxyethyl acrylate, 2-hydroxyethyl methacrylate, hydroxypropyl acrylate and hydroxypropyl methacrylate; amino group-containing monomers such as aminoethyl acrylate, aminopropyl acrylate, methacrylic acid amide, aminoethyl methacrylate, aminopropyl methacrylate, dimethylaminoethyl acrylate and dimethylaminoethyl methacrylate; and α-olefins such as ethylene.

As the catalysts, mention may be made of, for example, known polymerization initiators, e.g., peroxides such as t-butylperoxy benzoate, di-t-butyl peroxide, cumene perhydroxide, acetyl peroxide, benzoyl peroxide and lauroyl peroxide; and azo compounds such as azobisisobutyronitrile, azobis-2,4-dimethylvaleronitrile and azobiscyclohexanecarbonitrile.

As the non-reactive solvents, mention may be made of, for example, aliphatic hydrocarbon solvents such as hexane and mineral spirit; aromatic hydrocarbon solvents such as benzene, toluene and xylene; ester solvents such as butyl acetate; alcohol solvents such as methanol and butanol; ketone solvents such as methyl ethyl ketone and isobutyl methyl ketone; and non-protonic polar solvents such as dimethylformamide, dimethyl sulfoxide, N-methylpyrrolidone and pyridine. These solvents may be used in combination.

The reaction methods include generally known methods such as bulk polymerization, solution polymerization, suspension polymerization, emulsion polymerization and redox polymerization. Of these methods, solution polymerization is preferred because this method is simple.

The reaction conditions vary depending on the polymerization initiator and solvent used, but the reaction temperature is not higher than 180° C., preferably 30–150° C., and the reaction time is from 30 minutes to 40 hours, preferably from 2 hours to 30 hours.

As mentioned above, according to the present invention, the graft copolymer A is adsorbed to the particulate material, whereby the particulate material is finely dispersed and dispersion stabilized, and electric charge is given to the particulate material. From the point of dispersion stability for various solvents, when the graft copolymer is crosslinked and is adsorbed to the particulate material, the dispersion stability can be further improved.

The kind of linkage in crosslinking is not especially limited and includes ester linkage, amino linkage, urethane linkage, ether linkage and C—C linkage formed by radical reaction. The ester linkage and amino linkage are especially preferred from the points of reaction rate, reaction time and stability at dispersion of the particulate material.

Method for crosslinking the graft copolymer A includes a method of using crosslinking agents and a method of introducing a functional group for crosslinking into the graft copolymer A.

The crosslinking agents are not limited as far as they can react with the polar group in the graft copolymer A, and examples thereof are amino resins such as melamine resins, benzoguanamine resins and urea resins; isocyanate resins such as tolylene diisocyanate prepolymers, polyfunctional aromatic polyisocyanates, diphenylmethane diisocyanate, hexamethylene diisocyanate prepolymers, xylylene isocyanate prepolymers and lysine isocyanate prepolymers; epoxy resins such as bisphenol A and acrylic resins having glycidyl group; and chelate compounds of Ti, Al, Zr or the like. Among them, amino resins and epoxy resins are especially preferred from the points of reaction rate and reaction temperature. Since silicone acrylic copolymers have only one kind of functional group, crosslinking agents are sometimes needed.

The functional groups for crosslinking introduced into the graft copolymer A include amino group, hydroxyl group, methoxy group, glycidyl group and the like. Among them, hydroxyl group and glycidyl group are especially preferred from the points of reaction rate and reaction temperature.

As the method for introducing the functional group for crosslinking, generally known ones can be employed. For example, there are a method of carrying out polymerization or condensation using monomers having the functional group for crosslinking, polyhydric alcohol and hydroxylamine or polyamine at the time of preparation of the graft copolymer A having acidic group and a method of introducing the crosslinking functional group by polymerization, condensation or addition reaction after preparation of a prepolymer of the graft copolymer A having acidic group. It is needless to say that after the introduction of the functional group for crosslinking, the graft copolymer A is adsorbed to the particulate material.

Examples of the monomers having the functional group for crosslinking used in preparation of the graft copolymer A are hydroxyl group-containing monomers such as 2-hydroxyethyl acrylate, 2-hydroxyethyl methacrylate, hydroxypropyl acrylate, hydroxypropyl methacrylate, glycerol monomethacrylate, polyethylene glycol monomethacrylate, propylene glycol monomethacrylate, polyethylene glycol monoacrylate and propylene glycol monoacrylate; glycidyl group-containing monomers such as glycidyl acrylate and glycidyl methacrylate; methoxy group-containing monomers such as methoxypolyethylene glycol and methoxypolyethylene glycol methacrylate; and amino group-containing monomers such as acrylamide and methacrylamide. Among them, glycidyl group-containing monomers are preferred since hydroxyl group is produced after the reaction to improve the electric charge of the particulate material.

Furthermore, in the method of introducing the functional group for crosslinking by polymerization, condensation or addition reaction after preparation of the prepolymer of the graft copolymer A, compounds having the crosslinking functional group for introduction by polymerization, condensation or addition reaction are not limited as far as they have two or more reactive groups, and examples of the compounds are polyhydric alcohols, polyamines, hydroxyamines, bisphenol A and polyisocyanates.

The particulate materials are not limited as far as they are insoluble in organic solvents, and examples of the particulate materials are inorganic pigments, organic pigments, dyes insoluble in solvents, fillers, medicines, polymerization initiators, catalysts, and ultraviolet absorbers.

Examples of the inorganic pigments are carbon black, titanium oxide, zinc white, zinc oxide, tripone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, chrome yellow, cadmium yellow, yellow iron oxide, titan yellow, chromium oxide, viridian, cobalt green, titan cobalt green, cobalt chrome green, ultramarine, ultramarine blue, prussian blue, cobalt blue, cerulean blue, manganese violet, cobalt violet and mica.

Examples of the organic pigments are azo, azomethine, polyazo, phthalocyanine, quinacridone, anthraquinone, indigo, thioindigo, quinophthalone, benzimidazolone, isoindoline and isoindolinone pigments.

Examples of the dyes insoluble in solvents are azo, anthraquinone, indigo, phthalocyanine, carbonyl, quinonimine, methine, quinoline and nitro dyes. Among them, disperse dyes are especially preferred.

In the dispersion composition of the present invention, amount of the graft copolymer A adsorbed to the particulate material is not limited, but is preferably in the range of 20–3000 parts by weight based on 100 parts by weight of the particulate material. If the amount of the graft copolymer A is less than 20 parts by weight, dispersion stability is lost, and if it exceeds 3000 parts by weight, content of the particulate material in the dispersion composition decreases and it becomes difficult to obtain a concentration of the particulate material sufficient for utilizing as ink, toner, etc. In the dispersion composition of the present invention, more preferred range of the amount of the graft copolymer A for the particulate material is 30–1000 parts by weight based on 100 parts by weight of the particulate material.

Exact mechanism of adsorption of the graft copolymer A to the particulate material has not yet been elucidated. It is supposed that the graft copolymer A is adsorbed to the surface of the particulate material by one of or combination of the following manners: chemical bonding (for example, an acid-base bonding such as bonding between basic site on the surface of the particulate material and acidic site of the graft copolymer A caused by deviation of electrons or between a tertiary amino group introduced onto the surface of the particulate material and a carboxyl group introduced into the graft copolymer A, ionic bonding caused by formation of salt by a metal ion of bivalence or higher valence and the graft copolymer A, covalent bonding caused by polymerization based on the active group on the surface of the particulate material, and the like), physical adsorption (for example, adsorption caused by agglomeration force of the graft copolymer A becoming insoluble in solvent to result in agglomeration, mechanical adsorption caused by dispersing the particulate material and the graft copolymer A by a dispersing machine, and the like) or physico-chemical adsorption (for example, caused by dispersing the graft copolymer A and the particulate material and reacting the active group on the surface of the particulate material with the graft copolymer A while adsorbing the graft copolymer A to the surface of the particulate material, and the like).

The amount of the graft copolymer A adsorbed to the particulate material can be measured by generally known method. For example, it can be indirectly measured by adjusting the concentration of nonvolatile matter to a given concentration, then subjecting the dispersion composition to centrifugal separation until the supernatant liquid becomes transparent, and measuring the concentration of the graft copolymer A in the supernatant liquid.

The organic solvents usable in the dispersion composition of the present invention are not limited, but are preferably those which are small in polarity and have a resistivity of not less than $10^9$ Ωcm. The organic solvents suitable for such purpose include, for example, aliphatic hydrocarbon solvents such as hexane and mineral spirit; silicone oils such as dialkylpolysiloxanes and cyclic polydialkylsiloxane; vegetable oils such as olive oil, safflower oil, sunflower oil, soybean oil and linseed oil; aromatic hydrocarbon solvents such as benzene, toluene and xylene; ester solvents such as butyl acetate; alcohol solvents such as methanol and butanol; ketone solvents such as methyl ethyl ketone and isobutyl methyl ketone; and non-protonic polar solvents such as dimethylformamide, dimethyl sulfoxide, N-methylpyrrolidone and pyridine. These solvents may be used each alone or in combination of two or more. Of these solvents, considering generation of electric charge, preferred are, for example, aliphatic hydrocarbons such as hexane, mineral spirit and Isopar series manufactured by Exone Chemical Co., Ltd., silicone oils such as dialkylpolysiloxanes and cyclic polydialkylsiloxanes; and vegetable oils such as olive oil, safflower oil, sunflower oil, soybean oil and linseed oil, and more preferred are non-protonic organic solvents which are non-polar organic solvents having a resistivity of not less than $10^9$ Ωcm (e.g., aliphatic hydrocarbons and silicone oils).

Proportion of the organic solvents is preferably 50–10000 parts by weight, more preferably 100–3000 parts by weight based on 100 parts by weight of the particulate material. The dispersion composition of the present invention may additionally contain surface active agents, preservatives, deodorants, anti-skinning agents, perfumes, pigment dispersants, pigment derivatives, and the like.

The dispersion composition of the present invention can be produced, for example, by mixing a dispersion prepared by dispersing the particulate material using the graft copolymer A in an organic solvent in which the graft copolymer A is soluble with an organic solvent in which the graft copolymer A is insoluble, whereby the graft copolymer A is precipitated and adsorbed to the particulate material.

In more detail, the production method of the dispersion composition comprises a dispersing step A where the particulate material is dispersed using the graft copolymer A in an organic solvent in which the graft copolymer A is soluble, a mixing step B where an organic solvent in which the graft copolymer A is insoluble is poured into the dispersion obtained in the dispersing step A or the dispersion obtained in the dispersing step A is poured into an organic solvent in which the graft copolymer A is insoluble, followed by mixing them to precipitate the graft copolymer A and to adsorb the graft copolymer to the particulate material, an optional crosslinking step C where the graft copolymer A is fixed by crosslinking, and an optional concentrating step D where the solvent is distilled off.

In the dispersing step A, the graft copolymer A is dissolved in the organic solvent and the particulate material is added thereto and, if necessary, dispersing is carried out using a dispersing medium such as glass beads, steel beads or zirconia beads and by a dispersing machine, e.g., beads mill such as dyno-mill or DSP mill, roll mill, sand mill, attritor, kneader or a high-pressure jetting mill such as nanomizer, thereby obtaining a dispersion. Furthermore, if necessary, to the dispersion, there may be added various additives such as surface active agents, pigment dispersants, pigment derivatives, and charge generators.

The conditions for dispersing by dispersing machines vary depending on the kind of the particulate material or the kind of dispersing machines, but from economical viewpoint, the temperature is preferably 0–150° C., and the dispersing time is preferably as shorter as possible, but 0.1–10 hours/kg is preferred from the point of productivity. Dispersion particle diameter after performing the dispersing is preferably smaller than that of submicron particles, and more preferably not more than 0.5 micron considering sedimentation and agglomeration.

The measuring method is not limited and generally employed methods are utilized. For example, there may be used particle size distribution meter of laser scattering type or centrifugal settling type. Moreover, the crosslinking agent for crosslinking the graft copolymer A is added before or after the dispersing. It is especially preferred to add it after the dispersing because of less influence on reaction or the like at the time of dispersing. Amount of the crosslinking agent is not limited as far as the graft copolymer A can be crosslinked and fixed on the particulate material, but is preferably 2–100 parts by weight, more preferably 5–50 parts by weight based on 100 parts by weight of the graft copolymer A.

In the next mixing step B, the organic solvent in which the graft copolymer A is insoluble is slowly added to the dispersion prepared in the dispersing step A or the dispersion obtained in the dispersing step A is slowly added to the organic solvent in which the graft copolymer A is insoluble, followed by mixing them. In this case, at the time of addition or after addition, the dispersion is uniformly mixed using a simple stirrer such as three-one motor, magnetic stirrer, disper or homogenizer. Furthermore, the organic solvent in which the graft copolymer A is insoluble and the dispersion prepared in the dispersing step A are mixed at one time using a mixing machine such as a line mixer. After addition, a dispersing machine such as a beads mill or a high-pressure jetting mill may be employed for the purpose of making finer the precipitated particles.

The organic solvents in which the graft copolymer A is insoluble are not limited as far as the graft copolymer A does not dissolve therein, but especially preferred are those having a solubility parameter of not more than 7.8. Examples of the organic solvents having a solubility parameter of not more than 7.8 are aliphatic hydrocarbons such as hexane, mineral spirit and Isopar series manufactured by Exone Chemical Co., Ltd., silicones such as dialkylpolysiloxanes and cyclic polydialkylsiloxanes, vegetable oils such as olive oil, safflower oil, sunflower oil, soybean oil and linseed oil, and diethyl ether. Amount of the organic solvents used here is preferably 0–10000 parts by weight based on 100 parts by weight of the graft copolymer A for increasing the concentration of the particulate material in the resulting dispersion composition.

In the crosslinking step C of fixing the graft copolymer A by crosslinking, the crosslinking method is not limited, and examples are heating, and irradiation with ultraviolet rays or electron rays. Especially, heating is preferred from the points of reactivity and simple reaction apparatus used. The temperature for crosslinking by heating is not limited so long as the dispersion state of the particulate material is not broken, but is preferably not higher than 200° C., more preferably not higher than 180° C.

The concentrating step D is carried out depending on use of the particulate material. Moreover, the concentrating step may be carried out before the crosslinking step C. For the concentration of the solvent, general atmospheric or vacuum distillation can be employed. For example, in the case of utilizing the dispersion composition with silicone solvent, an organic solvent having a boiling point lower than that of the silicone solvent is used as the organic solvent dissolving the graft copolymer A, and concentration is carried out by atmospheric distillation. On the other hand, in the case of utilizing the dispersion composition with the organic solvent dissolving the graft copolymer A, a silicone solvent having a boiling point lower than that of the organic solvent dissolving the graft copolymer A is used, and concentration is carried out by atmospheric distillation. Furthermore, if necessary, the solvent is completely distilled off or replaced with water, followed by drying, and the resulting dispersion composition can be utilized as powdered paints, toners, plastics and others.

The use of this dispersion composition is not limited, and examples thereof are paints for automobiles, constructions and PCM, printing inks such as gravure inks, inks for ink jet printers, liquid toners for wet electrophotographic printing machines or ink jet printers utilizing electrostatic force (disclosed, for example, in JP-A-8-291267, Japanese Patent No.2735030, and "High-concentration ink jet recording" in FALL Meeting of JHC '98). Particularly, in the field of liquid toners, the toners are excellent in long-term use stability since no special charge generating agent is needed and, besides, the electric charge is stably fixed on the surface of the particulate material.

In using the dispersion composition of the present invention for these uses, the composition is adjusted to a given concentration of particulate material or a given binder concentration by adding a binder, an organic solvent and various additives depending on the use. As the binder, there may be used generally known ones, for example, natural protein, celluloses, synthetic polymers such as polyvinyl alcohol, polyacrylamide, aromatic amides, polyacrylic acids, polyvinyl ether, polyvinyl pyrrolidone, acrylic resins, polyester resins, alkyd resins, urethane resins, amide resins, melamine resins, ether resins, fluorocarbon resins, styrene-acrylic resins, and styrene-maleic acid resins, photosensitive resins, thermosetting resins, ultraviolet-curing resins or electron ray-curing resins. The binders are not limited to these examples.

The various additives include generally known additives, e.g., anionic, cationic and nonionic surface active agents, anti-skinning agents, leveling agents, electric charge adjusting agents such as metallic soaps and lecithin, and wetting agents. These are not limiting.

Preparation of final paints, printing inks or wet toners by adding the above binders, organic solvents and various additives to the dispersion composition of the present invention can be performed by using a simple stirrer such as disper, and dispersing machines and others which are conventionally needed are not necessary and thus production with energy-saving and at low cost becomes possible.

The present invention will be explained in more detail by the following examples and comparative examples. In the following disclosure, "part" and "%" mean "part by weight" and "% by weight" unless otherwise notified. Furthermore, unless there are any notes, the reagents used are first class grade chemicals manufactured by Wako Junyaku Co., Ltd.

PREPARATION EXAMPLE 1

Preparation of Graft Copolymer A

| | |
|---|---|
| n-Butyl methacrylate | 16.1 parts |
| Lauryl methacrylate | 10.0 parts |
| Styrene | 35.0 parts |
| Methacrylic acid | 6.9 parts |
| Glycidyl methacrylate | 12.0 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to boiling point under sealing with nitrogen. The above solution was added thereto dropwise over 2 hours, and after completion of addition, reaction was carried out for 6 hours under reflux. The solution after the reaction was a polymeric compound having a nonvolatile matter of 49.8%, an acid value of 44.2 KOH mg/g and a number-average molecular weight of 7000.

One part of this polymeric compound was diluted with a dimethylsiloxane solvent KF-96L-1.0 (manufactured by Shin-Etsu Chemical Co., Ltd.). When 0.5 part of the dimethylsiloxane solvent was added, precipitation occurred thereby obtaining a dispersion having an average particle diameter of 0.066 μm (measured by a Laser Doppler type particle size distribution meter N4 PLUS manufactured by Kohlter Co., Ltd.).

Moreover, 1 part of the above polymeric compound was diluted with an aliphatic hydrocarbon solvent Isopar G (manufactured by Exone Co., Ltd.). When 7.2 g of Isopar G was added, precipitation occurred thereby obtaining a dispersion having an average particle diameter of 0.051 μm (measured by a Laser Doppler type particle size distribution meter N4 PLUS manufactured by Kohlter Co., Ltd.).

PREPARATION EXAMPLE 2

Preparation of Graft Copolymer A

| | |
|---|---|
| n-Butyl methacrylate | 18.4 parts |
| Lauryl methacrylate | 10.0 parts |
| Styrene | 35.0 parts |
| Methacrylic acid | 4.6 parts |
| Glycidyl methacrylate | 12.0 parts |

-continued

| | |
|---|---|
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to boiling point under sealing with nitrogen. The above solution was added thereto dropwise over 2 hours, and after completion of addition, reaction was carried out for 6 hours under reflux. The solution after the reaction was a polymeric compound having a nonvolatile matter of 48.6%, an acid value of 29.8 KOH mg/g and a number-average molecular weight of 6500.

One part of this polymeric compound was diluted with a dimethylsiloxane solvent KF-96L-1.0 (manufactured by Shin-Etsu Chemical Co., Ltd.). When 0.6 part of the dimethylsiloxane solvent was added, precipitation occurred thereby obtaining a dispersion having an average particle diameter of 42 nm (measured by a Laser Doppler type particle size distribution meter N4 PLUS manufactured by Kohlter Co., Ltd.).

Moreover, 1 part of the above polymeric compound was diluted with an aliphatic hydrocarbon solvent Isopar G (manufactured by Exone Co., Ltd.). When 1.0 part of Isopar G was added, precipitation occurred thereby obtaining a dispersion having an average particle diameter of 0.048 $\mu$m (measured by a Laser Doppler type particle size distribution meter N4 PLUS manufactured by Kohlter Co., Ltd.).

PREPARATION EXAMPLE 3

Preparation of Graft Copolymer

| | |
|---|---|
| n-Butyl methacrylate | 9.8 parts |
| Lauryl methacrylate | 29.2 parts |
| Styrene | 35.0 parts |
| Methacrylic acid | 9.0 parts |
| Glycidyl methacrylate | 12.0 parts |
| X-22-174DX (silicone macromonomer comprising dimethylsiloxane and alkylene group of 3 carbon atoms manufactured by Shin-Etsu Chemical Co., Ltd.) | 26.0 parts |
| Perbutyl O (peroxy ester manufactured by by Nippon Oil & Fats Co., Ltd.) | 8.0 parts |
| Methyl ethyl ketone | 35.3 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to boiling point under sealing with nitrogen. The above solution was added thereto dropwise over 2 hours, and after completion of addition, reaction was carried out for 6 hours under reflux.

The solution after the reaction was a polymeric compound having a nonvolatile matter of 42.9%, an acid value of 61.0 KOH mg/g and a number-average molecular weight of 3200. One part of this polymeric compound was diluted with a dimethylsiloxane solvent KF-96L-1.0 (manufactured by Shin-Etsu Chemical Co., Ltd.). When 1.7 part of the dimethylsiloxane solvent was added, precipitation occurred thereby obtaining a dispersion having an average particle diameter of 0.040 $\mu$m (measured by a Laser Doppler type particle size distribution meter N4 PLUS manufactured by Kohlter Co., Ltd.).

PREPARATION EXAMPLE 4

Preparation of Graft Copolymer

| | |
|---|---|
| n-Butyl methacrylate | 9.8 parts |
| Lauryl methacrylate | 29.2 parts |
| Styrene | 35.0 parts |
| Methacrylic acid | 9.0 parts |
| X-22-174DX (silicone macromonomer comprising dimethylsiloxane and alkylene group of 3 carbon atoms manufactured by Shin-Etsu Chemical Co., Ltd.) | 26.0 parts |
| Perbutyl O (peroxy ester manufactured by by Nippon Oil & Fats Co., Ltd.) | 8.0 parts |
| Methyl ethyl ketone | 22.2 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to boiling point under sealing with nitrogen. The above solution was added thereto dropwise over 2 hours, and after completion of addition, reaction was carried out for 6 hours under reflux.

The solution after the reaction was a polymeric compound having a nonvolatile matter of 45.3%, an acid value of 62.1 KOH mg/g and a number-average molecular weight of 3500. One part of this polymeric compound was diluted with a dimethylsiloxane solvent KF-96L-1.0 (manufactured by Shin-Etsu Chemical Co., Ltd.). When 1.5 part of the dimethylsiloxane solvent was added, precipitation occurred, thereby obtaining a dispersion having an average particle diameter of 0.060 $\mu$m (measured by a Laser Doppler type particle size distribution meter N4 PLUS manufactured by Kohlter Co., Ltd.).

PREPARATION EXAMPLE 5

Preparation of Graft Copolymer

| | |
|---|---|
| n-Butyl methacrylate | 26.8 parts |
| Styrene | 30.0 parts |
| 2-Hydroxyethyl methacrylate | 10.5 parts |
| 2-(Dimethylamino)ethyl methacrylate | 12.7 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux. The solution after the reaction was a polymeric compound having a nonvolatile matter of 50.5%, a hydroxyl value of 44.8 KOH mg/g, an amine value of 45.0 KOH mg/g and a number-average molecular weight of 8550.

One part of the above polymeric compound was diluted with an aliphatic hydrocarbon solvent Isopar G (manufactured by Exone Co., Ltd.). When 10.5 parts of Isopar G was added, precipitation occurred, thereby obtaining a dispersion having an average particle diameter of 0.038 μm (measured by a Laser Doppler type particle size distribution meter N4 PLUS manufactured by Kohlter Co., Ltd.).

Moreover, 1 part of this polymeric compound was diluted with a dimethylsiloxane solvent KF-96L-1 (manufactured by Shin-Etsu Chemical Co., Ltd.). When 7.2 parts of KF-96L-1 was added, precipitation occurred, thereby obtaining a dispersion having an average particle diameter of 0.043 g m (measured by a Laser Doppler type particle size distribution meter N4 PLUS manufactured by Kohlter Co., Ltd.).

PREPARATION EXAMPLE 6

Preparation of Graft Copolymer

| | |
|---|---|
| n-Butyl methacrylate | 5.7 parts |
| Styrene | 30.0 parts |
| 2-Hydroxyethyl methacrylate | 10.5 parts |
| 2-(Dimethylamino)ethyl methacrylate | 33.8 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux. The solution after the reaction was a polymeric compound having a nonvolatile matter of 52.8%, a hydroxyl value of 44.9 KOH mg/g, an amine value of 119.8 KOH mg/g and a number-average molecular weight of 8900.

One part of the above polymeric compound was diluted with an aliphatic hydrocarbon solvent Isopar G (manufactured by Exone Co., Ltd.). When 16.3 parts of Isopar G was added, precipitation occurred, thereby obtaining a dispersion having an average particle diameter of 0.041 μm (measured by a Laser Doppler type particle size distribution meter N4 PLUS manufactured by Kohlter Co., Ltd.).

PREPARATION EXAMPLE 7

Preparation of Graft Copolymer

| | |
|---|---|
| Styrene | 18.8 parts |
| 2-Hydroxyethyl methacrylate | 10.5 parts |
| 2-(Dimethylamino)ethyl methacrylate | 50.7 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed and diluted with 22.2 parts of methyl ethyl ketone to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux.

The solution after the reaction was a polymeric compound having a nonvolatile matter of 43.3%, a hydroxyl value of 45.1 KOH mg/g, an amine value of 178.3 KOH mg/g and a number-average molecular weight of 8700. One part of this polymeric compound was diluted with an aliphatic hydrocarbon solvent Isopar G (manufactured by Exone Co., Ltd.). When 9.9 parts of Isopar G was added, precipitation occurred, thereby obtaining a dispersion having an average particle diameter of 0.040 μm (measured by a Laser Doppler type particle size distribution meter N4 PLUS manufactured by Kohlter Co., Ltd.).

PREPARATION EXAMPLE 8

Preparation of Graft Copolymer

| | |
|---|---|
| n-Butyl methacrylate | 37.3 parts |
| Styrene | 30.0 parts |
| 2-(Dimethylamino)ethyl methacrylate | 12.7 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux.

The solution after the reaction was a polymeric compound having a nonvolatile matter of 50.9%, an amine value of 43.9 KOH mg/g and a number-average molecular weight of 11400. One part of this polymeric compound was diluted with an aliphatic hydrocarbon solvent Isopar G (manufactured by Exone Co., Ltd.). When 17.0 parts of Isopar G was added, precipitation occurred, thereby obtaining a dispersion having an average particle diameter of 0.038 μm (measured by a Laser Doppler type particle size distribution meter N4 PLUS manufactured by Kohlter Co., Ltd.).

PREPARATION EXAMPLE 9

Preparation of Graft Copolymer

| | |
|---|---|
| n-Butyl methacrylate | 31.0 parts |
| Styrene | 30.0 parts |
| 2-Hydroxyethyl methacrylate | 10.5 parts |
| 2-(Dimethylamino)ethyl methacrylate | 8.5 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux. The solution after the reaction was a polymeric compound having a nonvolatile matter of 50.3%, a hydroxyl value of 44.9 KOH mg/g, an amine value of 29.4 KOH mg/g and a number-average molecular weight of 8900.

One part of the above polymeric compound was diluted with an aliphatic hydrocarbon solvent Isopar G (manufactured by Exone Co., Ltd.). When 20.0 parts of Isopar G was added, precipitation occurred, thereby obtaining a dispersion having an average particle diameter of 0.040 µm (measured by a Laser Doppler type particle size distribution meter N4 PLUS manufactured by Kohlter Co., Ltd.).

PREPARATION EXAMPLE 10

Preparation of Graft Copolymer

| | |
|---|---|
| n-Butyl methacrylate | 26.8 parts |
| Styrene | 50.0 parts |
| 2-Hydroxyethyl methacrylate | 10.5 parts |
| 2-(Dimethylamino)ethyl methacrylate | 12.7 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed and diluted with 22.2 parts of methyl ethyl ketone to prepare a solution.

Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux.

The solution after the reaction was a polymeric compound having a nonvolatile matter of 61.8%, a hydroxyl value of 45.0 KOH mg/g, an amine value of 38.4 KOH mg/g and a number-average molecular weight of 10800. One part of this polymeric compound was diluted with an aliphatic hydrocarbon solvent Isopar G (manufactured by Exone Co., Ltd.). When 7.7 parts of Isopar G was added, precipitation occurred, thereby obtaining a dispersion having an average particle diameter of 0.035 µm (measured by a Laser Doppler type particle size distribution meter N4 PLUS manufactured by Kohlter Co., Ltd.).

PREPARATION EXAMPLE 11

Preparation of Graft Copolymer

| | |
|---|---|
| n-Butyl methacrylate | 26.8 parts |
| Styrene | 30.0 parts |
| 2-Hydroxyethyl methacrylate | 10.5 parts |
| Vinylpyridine | 12.7 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.
Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux.

The solution after the reaction was a polymeric compound having a nonvolatile matter of 56.7%, a hydroxyl value of 44.7 KOH mg/g, an amine value of 67.7 KOH mg/g and a number-average molecular weight of 10200. One part of this polymeric compound was diluted with an aliphatic hydrocarbon solvent Isopar G (manufactured by Exone Co., Ltd.). When 9.0 parts of Isopar G was added, precipitation occurred, thereby obtaining a dispersion having an average particle diameter of 0.126 µm (measured by a Laser Doppler type particle size distribution meter N4 PLUS manufactured by Kohlter Co., Ltd.).

PREPARATION EXAMPLE 12

Preparation of Graft Copolymer

| | |
|---|---|
| n-Butyl methacrylate | 31.0 parts |
| Lauryl methacrylate | 5.0 parts |
| Styrene | 30.0 parts |
| 2-Hydroxyethyl methacrylate | 10.5 parts |
| 2-(Dimethlamino)ethyl methacrylate | 8.5 parts |
| X-22-174DX (silicone macromonomer comprising dimethylsiloxane and alkylene group of 3 carbon atoms manufactured by Shin-Etsu Chemical Co., Ltd.) | 20.0 parts |
| Perbutyl O (peroxy ester manufactured by by Nippon Oil & Fats Co., Ltd.) | 8.0 parts |

The above components were mixed to prepare a solution.
Then, 100 parts of methyl ethyl ketone was weighed and charged in a reaction vessel equipped with a nitrogen introduction pipe and heated to boiling point under sealing with nitrogen. The above solution was added thereto dropwise over 4 hours, and after completion of addition, reaction was carried out for 12 hours under reflux.

The solution after the reaction was a polymeric compound having a nonvolatile matter of 48.3%, a hydroxyl value of 44.8 KOH mg/g, an amine value of 45.1 KOH mg/g and a number-average molecular weight of 7700. One part of this polymeric compound was diluted with an aliphatic hydrocarbon solvent Isopar G (manufactured by Exone Co., Ltd.). When 18.6 parts of Isopar G was added, precipitation occurred, thereby obtaining a dispersion having an average particle diameter of 0.035 µm (measured by a Laser Doppler type particle size distribution meter N4 PLUS manufactured by Kohlter Co., Ltd.).

PREPARATION EXAMPLE 13

Preparation of General Graft Copolymer

| | |
|---|---|
| n-Butyl methacrylate | 18.4 parts |
| Lauryl methacrylate | 10.0 parts |
| Styrene | 35.0 parts |
| Methacrylic acid | 4.6 parts |
| Glycidyl methacrylate | 12.0 parts |
| AK-32 (silicone macromonomer comprising dimethylsiloxane manufactured by Toagosei Chemical Industry Co., Ltd.) | 20.0 parts |
| Perbutyl O (peroxy ester manufactured by by Nippon Oil & Fats Co., Ltd.) | 8.0 parts |

The above components were mixed to prepare a solution.
Then, 100 parts of methyl ethyl ketone (first class grade chemical manufactured by Wako Junyaku Co., Ltd.) was weighed and charged in a reaction vessel equipped with a nitrogen introduction pipe and heated to boiling point under sealing with nitrogen. The above solution was added thereto dropwise over 2 hours, and after completion of addition, reaction was carried out for 6 hours under reflux.

The solution after the reaction was a polymeric compound having a nonvolatile matter of 48.6%, an acid value of 29.7 KOH mg/g and a number-average molecular weight of 9500. One part of this polymeric compound was diluted with an aliphatic hydrocarbon solvent Isopar G (manufactured by Exone Co., Ltd.). When 0.6 part of Isopar G was added, precipitation occurred, thereby obtaining a dispersion having an average particle diameter of 4.28 μm (measured by a Laser Doppler type particle size distribution meter N4 PLUS manufactured by Kohlter Co., Ltd.).

Moreover, 1 part of this polymeric compound was diluted with a dimethylsiloxane solvent KF-96L-1 (manufactured by Shin-Etsu Chemical Co., Ltd.). When 0.93 part of KF-96L-1 was added, precipitation occurred, thereby obtaining a dispersion having an average particle diameter of 4.56 μm (measured by a Laser Doppler type particle size distribution meter N4 PLUS manufactured by Kohlter Co., Ltd.) and containing large agglomerates.

| -continued | |
|---|---|
| Solsperse 5000 as phthalocyanine pigment derivative | 0.6 part |
| Methyl ethyl ketone | 12.0 parts |
| Zirconia beads of 3 mm φ | 100 parts |

The symbol φ represents average particle diameter.

The above were weighed and charged in a plastic bottle of 100 cc and dispersed for 2 hours by a paint shaker (manufactured by Eishin Co., Ltd.), followed by adding thereto 15.0 parts of methyl ethyl ketone and 15.0 parts of KF-96L-1 and mixing them to obtain a dispersion slurry.

45.0 Parts of the resulting dispersion slurry was mixed with 15.0 parts of methyl ethyl ketone and 15.0 parts of KF-96L-1 to prepare a mixed solution.

Then, 75 parts of KF-96L-1 as a silicone solvent was weighed and charged in a beaker and stirred by a magnetic stirrer. Under stirring, said mixed solution was slowly added thereto dropwise to precipitate a graft copolymer having acidic group on the surface of the particulate material.

After completion of the addition, methyl ethyl ketone was removed by vacuum distillation, and furthermore a

TABLE 1

Properties of graft copolymer

| | Nonvolatile content | Acid value | Hydroxyl value | Amine value | Number-average molecular weight | Particle diameter after precipitation (μm) | Polar group-containing monomer |
|---|---|---|---|---|---|---|---|
| Preparation Example 1 | 49.8 | 44.2 | 0 | 0 | 7000 | 0.066/0.051 | Methacrylic acid |
| Preparation Example 2 | 48.6 | 29.8 | 0 | 0 | 6500 | 0.06/0.048 | Methacrylic acid |
| Preparation Example 3 | 42.9 | 61.0 | 0 | 0 | 3200 | 0.040/— | Methacrylic acid |
| Preparation Example 4 | 45.3 | 62.0 | 0 | 0 | 3500 | 0.060/— | Methacrylic acid |
| Preparation Example 5 | 60.5 | 0 | 44.8 | 45.0 | 8550 | 0.043/0.038 | Dimethylaminoethyl methacrylate |
| Preparation Example 6 | 52.8 | 0 | 44.9 | 119.8 | 8900 | —/0.041 | Dimethylaminoethyl methacrylate |
| Preparation Example 7 | 43.3 | 0 | 45.1 | 178.3 | 8700 | —/0.040 | Dimethylaminoethyl methacrylate |
| Preparation Example 8 | 50.5 | 0 | 0 | 43.9 | 11400 | —/0.033 | Dimethylaminoethyl methacrylate |
| Preparation Example 9 | 50.3 | 0 | 44.9 | 29.4 | 8900 | —/0.040 | Dimethylaminoethyl methacrylate |
| Preparation Example 10 | 61.8 | 0 | 45.0 | 38.4 | 10800 | —/0.035 | Diethylaminoethyl methacrylate |
| Preparation Example 11 | 56.7 | 0 | 44.7 | 67.7 | 10200 | —/0.126 | Vinylpyridine |
| Preparation Example 12 | 48.3 | 0 | 44.8 | 45.1 | 7700 | —/0.035 | Dimethylaminoethyl methacrylate |
| General silicone graft copolymer | | | | | | | |
| Preparation Example 13 | 48.6 | 29.7 | 0 | 0 | 9500 | 4.56/4.28 | Methacrylic acid |

EXAMPLE 1

| | |
|---|---|
| Graft copolymer of Preparation Example 1 | 12.0 parts |
| Fastgen Blue TGR (copper-phthalocyanine blue pigment manufactured by Dainippon Ink & Chemicals Inc.) as particulate material | 5.4 parts | crosslinking reaction was carried out at 120° C. for 5 hours to obtain a dispersion composition having an acid value of 11.1 KOH mg/g, a hydroxyl value of 33.2 KOH mg/g and a pigment concentration of 4.75%. The resulting dispersion composition had an average particle diameter of 0.194 μm (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the adsorption amount was 99.5 parts based on 100 parts of the particulate material. Thus, nearly the total amount of the resin was adsorbed.

Furthermore, 63.1 parts of the above dispersion composition, 0.2 part of zirconium octylate and 36.7 parts of KF-96L-1 were mixed to prepare an oil ink jet ink having a pigment content of 3%. This ink jet ink had a zeta ($\zeta$) potential of 63.2 mV (measured by LAZER ZEE METER Model 501 manufactured by Penchem Co., Ltd.), a particle diameter of 0.173 $\mu$m and a viscosity of 1.18·mPa s (millipascal×seconds). Moreover, this ink jet ink was subjected to storage test for 14 days in a thermostat at 60° C. to find that the dispersion particle diameter was 0.174 $\mu$m, the viscosity was 1.17 mPa·s, agglomeration did not occur, and the $\zeta$ potential did not change, namely, was 62.5 mV, and thus the ink showed markedly excellent storage stability.

COMPARATIVE EXAMPLE 1

A dispersion composition having an acid value of 0.2 KOH mg/g, a hydroxyl value of 28.5 KOH mg/g and a pigment concentration of 4.6% was obtained in the same manner as in Example 1, except that 12.3 parts of the graft copolymer of Preparation Example 13 was used in place of the graft copolymer of Preparation Example 1 used in Example 1 and the amount of methyl ethyl ketone was reduced from 12.0 parts to 11.7 parts in the components to be dispersed by the paint shaker (manufactured by Eishin Co., Ltd.) for 2 hours. The resulting dispersion composition had a large dispersion particle diameter of 4.525 $\mu$m (measured by a Laser Doppler type particle size distribution meter N4 PLUS manufactured by Kohlter Co., Ltd.), sedimented in several hours and was inferior in stability to the composition of Example 1. Thus, the resulting dispersion composition could not be used for oil ink jet ink.

EXAMPLE 2

A dispersion composition having an acid value of 7.5 KOH mg/g, a hydroxyl value of 20.7 KOH mg/g and a pigment concentration of 4.9% was obtained in the same manner as in Example 1, except that 12.3 parts of the graft copolymer of Preparation Example 2 was used in place of the graft copolymer of Preparation Example 1 used in Example 1 and the amount of methyl ethyl ketone was reduced from 12.0 parts to 11.7 parts in the components to be dispersed by the paint shaker (manufactured by Eishin Co., Ltd.) for 2 hours. The resulting dispersion composition had a dispersion particle diameter of 0.229 $\mu$m (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 99.2 parts based on 100 parts of the particulate material. Thus, nearly the total amount of the resin was adsorbed.

Furthermore, 61.2 parts of the above dispersion composition, 0.2 part of zirconium octylate and 38.6 parts of KF-96L-1 were mixed to prepare an oil ink jet ink having a pigment content of 3%. This ink jet ink had a zeta ($\zeta$) potential of 83.7 mV (measured by LAZER ZEE METER Model 501 manufactured by Penchem Co., Ltd.), a particle diameter of 0.227 $\mu$m and a viscosity of 1.20 mPa·s. Moreover, this ink jet ink was subjected to storage test for 14 days in a thermostat at 60° C. to find that the dispersion particle diameter was 0.225 $\mu$m, the viscosity was 1.21 mPa·s, agglomeration did not occur, and the $\zeta$ potential did not change, namely, was 82.1 mV, and thus the ink showed markedly excellent storage stability.

EXAMPLE 3

| | |
|---|---|
| Graft copolymer of Preparation Example 2 | 12.3 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Methyl ethyl ketone | 11.7 parts |
| Zirconia beads of 3 mm $\phi$ | 100 parts |

The above were weighed and charged in a plastic bottle of 100 cc and dispersed for 4 hours by a paint shaker (manufactured by Eishin Co., Ltd.), followed by adding thereto 15.0 parts of methyl ethyl ketone and 15.0 parts of Isopar G (aliphatic hydrocarbon solvent manufactured by Exone Chemical Co., Ltd.) and mixing them to obtain a dispersion slurry.

45.0 Parts of the resulting dispersion slurry was mixed with 15.0 parts of methyl ethyl ketone and 15.0 parts of Isopar G to prepare a mixed solution.

Then, 75 parts of Isopar G was weighed and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation, and furthermore a crosslinking reaction was carried out at 120° C. for 5 hours to obtain a dispersion composition having an acid value of 6.3 KOH mg/g, a hydroxyl value of 22.8 KOH mg/g and a pigment concentration of 4.70%. The resulting dispersion composition had an average particle diameter of 0.234 $\mu$m (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the adsorption amount was 98.6 parts based on 100 parts of the particulate material. Thus, nearly the total amount of the resin was adsorbed.

Furthermore, 64.0 parts of the above dispersion composition, 0.2 part of zirconium octylate and 35.8 parts of KF-96L-1 were mixed to prepare an oil ink jet ink having a pigment content of 3%. This ink jet ink had a zeta ($\zeta$) potential of 53.1 mV (measured by LAZER ZEE METER Model 501 manufactured by Penchem Co., Ltd.), a particle diameter of 0.228 $\mu$m and a viscosity of 1.37 mPa·s. Moreover, this ink jet ink was subjected to storage test for 14 days in a thermostat at 60° C. to find that the dispersion particle diameter was 0.225 $\mu$m, the viscosity was 1.36 mPa·s, no agglomeration occurred, and the $\zeta$ potential also did not change, namely, was 52.8 mV, and thus the ink showed markedly excellent storage stability.

EXAMPLE 4

| | |
|---|---|
| Graft copolymer of Preparation Example 3 | 14.0 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Methyl ethyl ketone | 10.0 parts |
| Zirconia beads of 3 mm φ | 100 parts |

The above were weighed and charged in a plastic bottle of 100 cc and dispersed for 4 hours by a paint shaker (manufactured by Eishin Co., Ltd.), followed by adding thereto 30.0 parts of methyl ethyl ketone and mixing them to obtain a dispersion slurry.

Then, 85 parts of KF 995 (a cyclic silicone manufactured by Shin-Etsu Chemical Co., Ltd.) was weighed and charged in a beaker and stirred by a magnetic stirrer. Under stirring, 45.0 parts of said dispersion slurry was slowly added thereto dropwise to precipitate a graft copolymer on the surface of the particulate material.

After completion of the addition, methyl ethyl ketone was removed by vacuum distillation to obtain a dispersion composition having an acid value of 59.8 KOH mg/g and a pigment concentration of 5.4%. The resulting dispersion composition had a dispersion particle diameter of 0.156 μm (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the adsorption amount was 89.5 parts based on 100 parts of the particulate material. Thus, the resin was adsorbed.

Furthermore, 92.6 parts of the above dispersion composition and 7.4 parts of KF-995 were mixed to prepare an oil ink jet ink having a pigment content of 5%. This ink jet ink had a zeta (ζ) potential of 19.7 mV (measured by LAZER ZEE METER Model 501 manufactured by Penchem Co., Ltd.), a particle diameter of 0.148 μm and a viscosity of 6.8 mPa·s. Moreover, this ink jet ink was subjected to storage test for 14 days in a thermostat at 60° C. to find that the dispersion particle diameter was 0.149 μm, the viscosity was 6.76 mPa·s, no agglomeration occurred, and the ζ potential also did not change, namely, was 18.7 mV, and thus the ink showed markedly excellent storage stability.

EXAMPLE 5

| | |
|---|---|
| Graft copolymer of Preparation Example 4 | 13.2 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Methyl ethyl ketone | 10.8 parts |
| Zirconia beads of 3 mm φ | 100 parts |

The above were weighed and charged in a plastic bottle of 100 cc and dispersed for 4 hours by a paint shaker (manufactured by Eishin Co., Ltd.), followed by adding thereto 30.0 parts of methyl ethyl ketone and mixing them to obtain a dispersion slurry.

Then, 85 parts of KF 995 (a cyclic silicone manufactured by Shin-Etsu Chemical Co., Ltd.) was weighed and charged in a beaker and stirred by a magnetic stirrer. Under stirring, 45.0 parts of said dispersion slurry was slowly added thereto dropwise to precipitate the graft copolymer on the surface of the particulate material.

After completion of the addition, methyl ethyl ketone was removed by vacuum distillation to obtain a dispersion composition having an acid value of 60.3 KOH mg/g and a pigment concentration of 5.5%. The resulting dispersion composition had a dispersion particle diameter of 0.161 μm (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the adsorption amount was 86.5 parts based on 100 parts of the particulate material. Thus, the resin was adsorbed.

Furthermore, 90.9 parts of the above dispersion composition and 9.1 parts of KF-995 were mixed to prepare an oil ink jet ink having a pigment content of 5%. This ink jet ink had a zeta (ζ) potential of 18.3 mV (measured by LAZER ZEE METER Model 501 manufactured by Penchem Co., Ltd.), a particle diameter of 0.155 μm and a viscosity of 6.7 mPa·s. Moreover, this ink jet ink was subjected to storage test for 14 days in a thermostat at 60° C. to find that the dispersion particle diameter was 0.161 μm, the viscosity was 6.76 mPa's, no agglomeration occurred, and the ζ potential also did not change, namely, was 20.1 mV, and thus the ink showed markedly excellent storage stability.

EXAMPLE 6

| | |
|---|---|
| Graft copolymer of Preparation Example 1 | 13.5 parts |
| Fastgen Blue TGR (copper-phthalocyanine blue pigment manufactured by Dainippon Ink & Chemicals Inc.) as particulate material | 5.4 parts |
| Solsperse 5000 as phthalocyanine pigment derivative | 0.6 part |
| Methyl ethyl ketone | 10.5 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 15.0 parts of methyl ethyl ketone and 15.0 parts of Isopar G and mixing them to obtain a dispersion slurry.

45 Parts of the resulting dispersion slurry was mixed with 15.0 parts of methyl ethyl ketone and 15.0 parts of Isopar G to prepare a mixed solution.

Then, 75 parts of Isopar G was weighed and charged in a beaker and stirred by a magnetic stirrer. Under stirring, said mixed solution was slowly added thereto dropwise to precipitate a graft copolymer having acidic group on the surface of the particulate material.

After completion of the addition, methyl ethyl ketone was removed by vacuum distillation, and furthermore a crosslinking reaction was carried out at 120° C. for 5 hours to obtain a dispersion composition having an acid value of 25.2 KOH mg/g, a hydroxyl value of 19.4 KOH mg/g and a pigment concentration of 4.81%. The resulting dispersion composition had a dispersion particle diameter of 0.186 μm (measured by a Laser Doppler type particle size distribution meter N4 PLUS manufactured by Kohlter Co., Ltd.).

Moreover, when this dispersion composition was adjusted to 5% in nonvolatile matter concentration using Isopar G and subjected to centrifugal force of 33500 G for 5 hours to measure the amount of the adsorbed resin by the centrifugal sedimentation from the nonvolatile content in the supernatant liquid, the adsorption amount was 99.1 parts based on 100 parts of the particulate material. Thus, nearly the total amount of the resin was adsorbed.

Furthermore, 62.4 parts of the above dispersion composition, 0.2 part of zirconium octylate and 37.6 parts of Isopar G were mixed to prepare an oil ink jet ink having a pigment content of 3%. This ink jet ink had a zeta ($\zeta$) potential of 75.4 mV (measured by LAZER ZEE METER Model 501 manufactured by Penchem Co., Ltd.), a particle diameter of 0.183 μm and a viscosity of 1.42 mPa·s. Moreover, this ink jet ink was subjected to storage test for 14 days in a thermostat at 60° C. to find that the dispersion particle diameter was 0.179 μm, the viscosity was 1.43 mPa·s, no agglomeration occurred, and the $\zeta$ potential also did not change, namely, was 76.1 mV, and thus the ink showed markedly excellent storage stability.

EXAMPLE 7

| | |
|---|---|
| Graft copolymer of Preparation Example 1 | 12.0 parts |
| HOSTAPERM Pink EB TRANS (dimethyl-quinacridone pigment manufactured by Clariant Co., Ltd.) as particulate material | 6.0 parts |
| Methyl ethyl ketone | 12.0 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 15.0 parts of methyl ethyl ketone and 15.0 parts of Isopar G and mixing them to obtain a dispersion slurry.

45.0 Parts of the resulting dispersion slurry was mixed with 15.0 parts of methyl ethyl ketone and 15.0 parts of KF-96L-1 to prepare a mixed solution.

Then, 75.0 parts of Isopar G was weighed and charged in a beaker and stirred by a magnetic stirrer. Under stirring, said mixed solution was slowly added thereto dropwise to precipitate a graft copolymer having acidic group on the surface of the particulate material.

After completion of the addition, methyl ethyl ketone was removed by vacuum distillation, and furthermore a crosslinking reaction was carried out at 120° C. for 5 hours to obtain a dispersion composition having an acid value of 8.9 KOH mg/g, a hydroxyl value of 34.5 KOH mg/g and a pigment concentration of 4.58%. The resulting dispersion composition had a dispersion particle diameter of 0.192 μm (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 99.4 parts based on 100 parts of the particulate material. This showed that nearly the total amount of the resin was adsorbed.

Furthermore, 65.5 parts of the above dispersion composition, 0.2 part of zirconium octylate and 32.5 parts of Isopar G were mixed to prepare a liquid toner having a pigment content of 3%. This liquid toner had a zeta ($\zeta$) potential of 48.5 mV (measured by LAZER ZEE METER Model 501 manufactured by Penchem Co., Ltd.), and printing could be performed using the liquid toner. Moreover, the toner had a particle diameter of 0.189 μm and a viscosity of 1.35 mPa·s. Furthermore, this liquid toner was subjected to storage test for 14 days in a thermostat at 60° C. to find that the dispersion particle diameter was 0.191 Am, the viscosity was 1.34 mPa·s, no agglomeration occurred, and the $\zeta$ potential also did not change, namely, was 48.0 mV, and thus the toner showed markedly excellent storage stability.

COMPARATIVE EXAMPLE 2

| | |
|---|---|
| Solsperse 13940 (manufactured by Zeneka Co., Ltd.) as a polyester polymeric compound having basic group | 3.75 parts |
| HOSTAPERM Pink EB TRANS (dimethyl-quinacridone pigment manufactured by Clariant Co., Ltd.) as particulate material | 4.0 parts |
| Isopar G | 12.25 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 20.0 parts of Isopar G to obtain a dispersion composition.

The resulting dispersion composition had a pigment concentration of 10.0% and a dispersion particle diameter of 0.256 μm (measured by a Laser Doppler type particle size distribution meter N4 PLUS manufactured by Kohlter Co., Ltd.). Moreover, when this dispersion composition was subjected to centrifugal force of 33500 G for 5 hours to measure the amount of the adsorbed resin by the centrifugal sedimentation from the nonvolatile content in the supernatant liquid, the amount of the adsorbed resin was 11 parts based on 100 parts of the particulate material. Thus, this was a dispersion composition in which was dispersed the usual pigment to which the polymeric compound was adsorbed.

Furthermore, 30.0 parts of the above dispersion composition, 0.2 part of zirconium octylate and 69.8 parts of Isopar G were mixed to prepare a liquid toner having a pigment content of 3%. This liquid toner had a low zeta ($\zeta$) potential of 8 mV (measured by LAZER ZEE METER Model 501 manufactured by Penchem Co., Ltd.), and printing could not be performed using the liquid toner as it was. Moreover, the toner had a particle diameter of 0.252 μm and a viscosity of 1.48 mPa·s. Furthermore, this liquid toner was subjected to storage test for 14 days in a thermostat at 60° C. to find that the dispersion particle diameter was 0.299 μm, the viscosity increased to 1.98 mPa·s, sedimentation occurred, and thus the toner was inferior in storage stability to the toner of Example 7.

EXAMPLE 8

A dispersion composition having an acid value of 9.6 KOH mg/g, a hydroxyl value of 32.5 KOH mg/g and a pigment concentration of 4.45% was obtained in the same manner as in Example 7, except that 6.0 parts of NOVOPERM YELLOW P-HG (benzimidazolone pigment manufactured by Clariant Co., Ltd.) was used in place of HOSTAPERM PINK EB TRANS which was the particulate material used in Example 7 and the dispersing time was changed from 2 hours to 4 hours. The resulting dispersion composition had a dispersion particle diameter of 0.241 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount was 99.3 parts based on 100 parts of the particulate material. This showed that nearly the total amount of the resin was adsorbed.

Furthermore, 66.7 parts of the above dispersion composition, 0.2 part of zirconium octylate and 33.1 parts of Isopar G were mixed to prepare a liquid toner of 3% in pigment content used for wet electrophotography. This liquid toner had a zeta ($\zeta$) potential of 49.3 mV (measured by LAZER ZEE METER Model 501 manufactured by Penchem Co., Ltd.) and could be electrically charged without using a charge generator which was needed for conventional liquid toners, and printing was sufficiently possible using the liquid toner. Moreover, the toner had a particle diameter of 0.247 $\mu$m and a viscosity of 1.38 mPa·s. Furthermore, this liquid toner was subjected to storage test for 14 days in a thermostat at 60° C. to find that the dispersion particle diameter was 0.249 $\mu$m, the viscosity was 1.39 mPa·s, no agglomeration occurred, the $\zeta$ potential also did not change, namely, was 48.7 mV, and thus the toner showed markedly excellent storage stability.

EXAMPLE 9

A dispersion composition having an acid value of 12.5 KOH mg/g, a hydroxyl value of 32.1 KOH mg/g and a pigment concentration of 4.38% was obtained in the same manner as in Example 7, except that 5.7 parts of #4000B (carbon black manufactured by Mitsubishi Chemical Co., Ltd.) and 0.3 part of Solsperse 5000 were used in place of HOSTAPERM PINK EB TRANS which was the particulate material used in Example 7. The resulting dispersion composition had a dispersion particle diameter of 0.158 $\mu$m (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 99.6 parts based on 100 parts of the particulate material. This showed that nearly the total amount of the resin was adsorbed.

Furthermore, 68.5 parts of the above dispersion composition, 0.2 part of zirconium octylate and 31.3 parts of Isopar G were mixed to prepare a liquid toner of 3% in pigment content for wet electrophotography. This liquid toner had a zeta ($\zeta$) potential of 46.4 mV (measured by LAZER ZEE METER Model 501 manufactured by Penchem Co., Ltd.) and could be electrically charged without using a charge generator which was needed for conventional liquid toners, and printing was sufficiently possible using the liquid toner. Moreover, the toner had a particle diameter of 0.163 $\mu$m and a viscosity of 1.40 mPa·s. Furthermore, this liquid toner was subjected to storage test for 14 days in a thermostat at 60° C. to find that the dispersion particle diameter was 0.159 $\mu$m, the viscosity was 1.39 mPa·s, no agglomeration occurred, the $\zeta$ potential also did not change, namely, was 45.2 mV, and thus the toner showed markedly excellent storage stability.

EXAMPLE 10

The dispersion composition prepared in Example 7 was diluted with isopropyl alcohol to confirm applicability to polar solvents. As a result, the dispersion composition had a dispersion particle diameter of 0.191 $\mu$m and did not agglomerate. Thus, this was a dispersion composition which can be applied to printing inks, paints, etc. which use, for example, isopropyl alcohol.

COMPARATIVE EXAMPLE 3

The dispersion composition prepared in Comparative Example 2 was diluted with isopropyl alcohol to confirm applicability to polar solvents. As a result, the dispersion composition had a dispersion particle diameter of 0.453 $\mu$m and agglomerated. Thus, application of this dispersion composition to printing inks, paints, etc. which use, for example, isopropyl alcohol could not be expected.

EXAMPLE 11

A dispersion composition having an acid value of 18.5 KOH mg/g, a hydroxyl value of 24.3 KOH mg/g and a pigment concentration of 4.72% was obtained in the same manner as in Example 1, except that the amount of the graft copolymer of Preparation Example 1 used in Example 1 was reduced from 12 parts to 3.6 parts and the amount of methyl ethyl ketone was increased from 12 parts to 20.4,parts in the components to be dispersed by the paint shaker (manufactured by Eishin Co., Ltd.) for 2 hours. The resulting dispersion composition had a dispersion particle diameter of 0.185 nm. Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 29.3 parts based on 100 parts of the particulate material. Thus, nearly the total amount of the resin was adsorbed.

Furthermore, 63.6 parts of the above dispersion composition, 0.2 part of zirconium octylate and 35.9 parts of KF-96L-1 were mixed to prepare an ink jet ink of 3% in pigment content. This ink jet ink had a zeta ($\zeta$) potential of 18.2 mV (measured by LAZER ZEE METER Model 501 manufactured by Penchem Co., Ltd.), a particle diameter of 0.182 $\mu$m and a viscosity of 1.11 mPa·s. Furthermore, this ink was subjected to storage test for 14 days in a thermostat at 60° C. to find that the dispersion particle diameter was 0.189 $\mu$m, the viscosity was 1.13 mPa·s, no agglomeration occurred, the $\zeta$ potential also did not substantially change, namely, was 17.3 mV, and thus the ink showed markedly excellent storage stability.

EXAMPLE 12

| | |
|---|---|
| Graft copolymer of Preparation Example 5 | 11.9 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Isopar G | 12.1 parts |
| Zirconia beads of 3 mm $\phi$ | 100 parts |

The above were weighed and charged in a plastic bottle of 100 cc and dispersed for 2 hours by a paint shaker (manufactured by Eishin Co., Ltd.), followed by adding thereto 25.0 parts of methyl ethyl ketone and 25.0 parts of Isopar G and mixing them to obtain a dispersion slurry.

60.0 Parts of the resulting dispersion slurry was mixed with 7.5 parts of methyl ethyl ketone and 7.5 parts of Isopar G to prepare a mixed solution.

Then, 75 parts of Isopar G was weighed as an aliphatic hydrocarbon solvent and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation to obtain a dispersion composition having an amine value of 44.4 KOH mg/g and a pigment concentration of 4.0%. The resulting dispersion composition had a dispersion particle diameter of 0.110 μm (measured by a Laser Doppler type particle size distribution meter N4 PLUS manufactured by Kohlter Co., Ltd.). Moreover, when this dispersion composition was adjusted to 5% in nonvolatile matter concentration using Isopar G, and subjected to centrifugal force of 33500 G for 5 hours to measure the amount of the adsorbed resin by the centrifugal sedimentation from the nonvolatile content in the supernatant liquid, the adsorption amount of the resin was 82 parts based on 100 parts of the particulate material.

Furthermore, 75.0 parts of the above dispersion composition and 25.0 parts of Isopar G were mixed to prepare an oil ink for ink jet printer having a pigment content of 3%. This ink had a zeta (ζ) potential of 16.4 mV (measured by LAZER ZEE METER Model 501 manufactured by Penchem Co., Ltd.), a particle diameter of 0.113 μm and a viscosity of 1.2 mPa·s. Moreover, this ink was subjected to storage test for 14 days in a thermostat at 60° C. to find that the dispersion particle diameter was 0.117 μm, the viscosity was 1.2 mPa·s, no agglomeration occurred, and the ζ potential also did not change, namely, was 15.6 mV, and thus the ink showed markedly excellent storage stability.

EXAMPLE 13

A dispersion composition having an amine value of 118.9 KOH mg/g and a pigment concentration of 3.7% was obtained in the same manner as in Example 12, except that 11.4 parts of the graft copolymer of Preparation Example 6 was used in place of the graft copolymer of Preparation Example 5 used in Example 12 and the amount of Isopar G was increased from 12.1 parts to 12.6 parts in the components to be dispersed by the paint shaker (manufactured by Eishin Co., Ltd.) for 2 hours. The resulting dispersion composition had a dispersion particle diameter of 0.132 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 87 parts based on 100 parts of the particulate material.

Furthermore, 81.1 parts of the above dispersion composition and 18.7 parts of Isopar G were mixed, followed by adding 0.2 part of zirconium octylate (a mineral spirit solution having a nonvolatile content of 50.0%) as a charge generator to prepare an oil ink for ink jet printer of 3% in pigment content. This ink had a zeta (ζ) potential of 56.8 mV (measured by LAZER ZEE METER Model 501 manufactured by Penchem Co., Ltd.), a particle diameter of 0.131 μm and a viscosity of 1.3 mPa·s. Furthermore, this ink was subjected to storage test for 14 days in a thermostat at 60° C. to find that the dispersion particle diameter was 0.133 μm, the viscosity was 1.3 mPa·s, no agglomeration occurred, the ζ potential was 54.2 mV, and thus the ink had storage stability.

EXAMPLE 14

A dispersion composition having an amine value of 178.0 KOH mg/g and a pigment concentration of 3.9% was obtained in the same manner as in Example 12, except that 13.9 parts of the graft copolymer of Preparation Example 7 was used in place of the graft copolymer of Preparation Example 5 used in Example 12 and the amount of Isopar G was reduced from 12.1 parts to 10.1 parts in the components to be dispersed by the paint shaker (manufactured by Eishin Co., Ltd.) for 2 hours. The resulting dispersion composition had a dispersion particle diameter of 0.112 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 83 parts based on 100 parts of the particulate material.

Furthermore, 76.9 parts of the above dispersion composition and 22.9 parts of Isopar G were mixed, followed by adding 0.2 part of zirconium octylate (a mineral spirit solution having a nonvolatile content of 50.0%) as a charge generator to prepare an oil ink for ink jet printer of 3% in pigment content. This ink had a zeta (ζ) potential of 63.7 mV (measured by LAZER ZEE METER Model 501 manufactured by Penchem Co., Ltd.), a particle diameter of 0.113 μm and a viscosity of 1.2 mPa·s. Furthermore, this ink was subjected to storage test for 14 days in a thermostat at 60° C. to find that the dispersion particle diameter was 0.113 μm, the viscosity was 1.2 mPa·s, no agglomeration occurred, and the ζ potential was 61.2 mV, and thus the ink had storage stability.

EXAMPLE 15

A dispersion composition having an amine value of 43.2 KOH mg/g and a pigment concentration of 3.4% was obtained in the same manner as in Example 12, except that the graft copolymer of Preparation Example 8 was used in place of the graft copolymer of Preparation Example 5 used in Example 12 in the components to be dispersed by the paint shaker (manufactured by Eishin Co., Ltd.) for 2 hours. The resulting dispersion composition had a dispersion particle diameter of 0.160 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 53 parts based on 100 parts of the particulate material.

Furthermore, 88.2 parts of the above dispersion composition and 11.6 parts of Isopar G were mixed, followed by adding 0.2 part of zirconium octylate (a mineral spirit solution having a nonvolatile content of 50.0%) as a charge generator to prepare an oil ink for ink jet printer of 3% in pigment content. This ink had a zeta (ζ) potential of 30.9 mV (measured by LAZER ZEE METER Model 501 manufactured by Penchem Co., Ltd.), a particle diameter of 0.162 μm and a viscosity of 1.3 mPa·s. Furthermore, this ink was subjected to storage test for 14 days in a thermostat at 60° C. to find that the dispersion particle diameter was 0.165 μm, the viscosity was 1.3 mPa·s, no agglomeration occurred, and the ζ potential was 28.1 mV, and thus the ink had storage stability.

EXAMPLE 16

A dispersion composition having an amine value of 29.0 KOH mg/g and a pigment concentration of 3.7% was obtained in the same manner as in Example 12, except that the graft copolymer of Preparation Example 9 was used in place of the graft copolymer of Preparation Example 5 used in Example 12 in the components to be dispersed by the paint shaker (manufactured by Eishin Co., Ltd.) for 2 hours. The resulting dispersion composition had a dispersion particle diameter of 0.106 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount of the resin was 79 parts based on 100 parts of the particulate material.

Furthermore, 81.1 parts of the above dispersion composition and 18.7 parts of Isopar G were mixed, followed by adding 0.2 part of zirconium octylate (a mineral spirit solution having a nonvolatile content of 50.0%) as a charge generator to prepare an oil ink for ink jet printer of 3% in pigment content. This ink had a zeta (ζ) potential of 23.3 mV (measured by LAZER ZEE METER Model 501 manufactured by Penchem Co., Ltd.), a particle diameter of 0.104 μm and a viscosity of 1.1 mPa·s. Furthermore, this ink was subjected to storage test for 14 days in a thermostat at 60° C. to find that the dispersion particle diameter was 0.105 μm, the viscosity was 1.1 mPa·s, no agglomeration occurred, and the ζ potential was 21.7 mV, and thus the ink had storage stability.

EXAMPLE 17

| | |
|---|---|
| Graft copolymer of Preparation Example 1 | 12.4 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Isopar G | 11.6 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 11.8 parts of the silicone acryl copolymer of Preparation Example 5, 19.1 parts of methyl ethyl ketone and 19.1 parts of Isopar G and mixing them to obtain a dispersion slurry.

60.0 Parts of the resulting dispersion slurry was mixed with 7.5 parts of methyl ethyl ketone and 7.5 parts of Isopar G to prepare a mixed solution.

Then, 75 parts of Isopar G was weighed as an aliphatic hydrocarbon solvent and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation, and furthermore a crosslinking reaction was carried out at 120° C. for 5 hours to obtain a dispersion composition having an acid value of 31.2 KOH mg/g, an amine value of 39.5 KOH mg/g and a pigment concentration of 4.0%. The resulting dispersion composition had a dispersion particle diameter of 0.137 μm (measured by a Laser Doppler type particle size distribution meter N4 PLUS manufactured by Kohlter Co., Ltd.). When this dispersion composition was subjected to centrifugal force of 33500 G for 5 hours to measure the amount of the adsorbed resin by the centrifugal sedimentation from the nonvolatile content in the supernatant liquid, the adsorption amount of the resin was 168 parts based on 100 parts of the particulate material.

Furthermore, 75.0 parts of the above dispersion composition and 24.8 parts of Isopar G were mixed, followed by adding 0.2 part of zirconium octylate (a mineral spirit solution having a nonvolatile content of 50.0%) as a charge generator to prepare an oil ink for ink jet printer having a pigment content of 3%. This ink had a zeta (ζ) potential of 29.9 mV (measured by LAZER ZEE METER Model 501 manufactured by Penchem Co., Ltd.), a particle diameter of 0.137 μm and a viscosity of 1.2 mPa·s. Moreover, this ink was subjected to storage test for 14 days in a thermostat at 60° C. to find that the dispersion particle diameter was 0.140 μm, the viscosity was 1.2 mPa·s, no agglomeration occurred, and the ζ potential was 29.1 mV, and thus the ink showed storage stability.

EXAMPLE 18

| | |
|---|---|
| Graft copolymer of Preparation Example 1 | 12.4 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| Methyl ethyl ketone | 11.6 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 10.8 parts of the silicone acryl copolymer of Preparation Example 12, 19.6 parts of methyl ethyl ketone and 19.6 parts of Isopar G and mixing them to obtain a dispersion slurry.

30.0 Parts of the resulting dispersion slurry was mixed with 4.1 parts of the silicone acryl copolymer of Preparation Example 12, 4.7 parts of the silicone acryl copolymer of Preparation Example 1, 18.4 parts of methyl ethyl ketone and 18.4 parts of Isopar G to prepare a mixed solution.

Then, 75 parts of Isopar G was weighed as an aliphatic hydrocarbon solvent and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation, and furthermore a crosslinking reaction was carried out at 120° C. for 5 hours to obtain a dispersion composition having an acid value of 26.5 KOH mg/g, an amine value of 41.1 KOH mg/g and a pigment concentration of 2.1%. The resulting dispersion composition had a dispersion particle diameter of 0.204 μm (measured by a Laser Doppler type particle size distribution meter N4 PLUS manufactured by Kohlter Co., Ltd.). When this dispersion composition was subjected to centrifugal force of 33500 G for 5 hours to measure the amount of the adsorbed resin by the centrifugal sedimentation from the nonvolatile content in the supernatant liquid, the adsorption amount of the resin was 304 parts based on 100 parts of the particulate material.

Furthermore, 95.5 parts of the above dispersion composition and 4.3 parts of Isopar G were mixed, followed by adding 0.2 part of zirconium octylate (a mineral spirit solution having a nonvolatile content of 50.0%) as a charge generator to prepare an oil ink for ink jet printer having a pigment content of 2%. This ink had a zeta (ζ) potential of 31.3 mV (measured by LAZER ZEE METER Model 501 manufactured by Penchem Co., Ltd.), a particle diameter of 0.203 μm and a viscosity of 1.3 mPa·s. Moreover, this ink was subjected to storage test for 14 days in a thermostat at 60° C. to find that the dispersion particle diameter was 0.207 μm, the viscosity was 1.3 mPa·s, no agglomeration occurred, and the ζ potential was 29.9 mV, and thus the ink showed storage stability.

EXAMPLE 19

| | |
|---|---|
| Graft copolymer of Preparation Example 6 | 11.4 parts |
| CINQUASIA Magenta RT-355-D (manufactured by Ciba Specialty Chemicals Co., Ltd.) as particulate material | 6.0 parts |
| Isopar G | 12.6 parts |
| Zirconia beads of 3 mm φ | 100 parts |

The above were weighed and charged in a plastic bottle of 100 cc and dispersed for 4 hours by a paint shaker (manufactured by Eishin Co., Ltd.), followed by adding thereto 25.0 parts of methyl ethyl ketone and 25.0 parts of Isopar G and mixing them to obtain a dispersion slurry.

60.0 Parts of the resulting dispersion slurry was mixed with 7.5 parts of methyl ethyl ketone and 7.5 parts of Isopar G to prepare a mixed solution.

Then, 75 parts of Isopar G was weighed as an aliphatic hydrocarbon solvent and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation to obtain a dispersion composition having an amine value of 117.8 KOH mg/g and a pigment concentration of 3.8%. The resulting dispersion composition had a dispersion particle diameter of 0.243 μm (measured by a Laser Doppler type particle size distribution meter N4 PLUS manufactured by Kohlter Co., Ltd.). When this dispersion composition was subjected to centrifugal force of 33500 G for 5 hours to measure the amount of the adsorbed resin by the centrifugal sedimentation from the nonvolatile content in the supernatant liquid, the adsorption amount of the resin was 77 parts based on 100 parts of the particulate material.

Furthermore, 78.9 parts of the above dispersion composition and 20.9 parts of Isopar G were mixed, followed by adding 0.2 part of zirconium octylate (a mineral spirit solution having a nonvolatile content of 50.0%) as a charge generator to prepare an oil ink for ink jet printer having a pigment content of 3%. This ink had a zeta (ζ) potential of 48.5 mV (measured by LAZER ZEE METER Model 501 manufactured by Penchem Co., Ltd.), a particle diameter of 0.239 μm and a viscosity of 1.6 mPa·s. Moreover, this ink was subjected to storage test for 14 days in a thermostat at 60° C. to find that the dispersion particle diameter was 0.239 μm, the viscosity was 1.6 mPa·s, no agglomeration occurred, and the ζ potential was 48.7 mV, and thus the ink showed storage stability.

COMPARATIVE EXAMPLE 4

A dispersion composition having an acid value of 11.0 KOH mg/g and a pigment concentration of 3.7% was obtained in the same manner as in Example 19, except that 12.3 parts of the graft copolymer of Preparation Example 13 was used in place of the graft copolymer of Preparation Example 6 used in Example 19 and the amount of Isopar G was reduced from 12.6 parts to 11.7 parts in the components to be dispersed by the paint shaker (manufactured by Eishin Co., Ltd.) for 2 hours. The resulting dispersion composition had a large dispersion particle diameter of 5.224 μm (measured by a Laser Doppler type particle size distribution meter N4 PLUS manufactured by Kohlter Co., Ltd.) and sedimented in several hours. Thus, this dispersion composition was inferior in stability to the composition of Example 19 and could not be used for oil inks for ink jet printers.

EXAMPLE 20

A dispersion composition having an amine value of 119.3 KOH mg/g and a pigment concentration of 3.9% was obtained in the same manner as in Example 19, except that Yellow HG AF LP901 (manufactured by Clariant Japan Co., Ltd.) was used in place of CINQUASIA Magenta RT-355-D used as the particulate material in Example 19 in the components to be dispersed by the paint shaker (manufactured by Eishin Co., Ltd.) for 2 hours. The resulting dispersion composition had a dispersion particle diameter of 0.222 μm (measured by a Laser Doppler type particle size distribution meter N4 PLUS manufactured by Kohlter Co., Ltd.). Furthermore, when this dispersion composition was subjected to centrifugal force of 33500 G for 5 hours to measure the amount of the adsorbed resin by the centrifugal sedimentation from the nonvolatile content in the supernatant liquid, the adsorption amount obtained was 79 parts based on 100 parts of the particulate material.

Furthermore, 76.9 parts of the above dispersion composition and 22.9 parts of Isopar G were mixed, followed by adding 0.2 part of zirconium octylate (a mineral spirit solution having a nonvolatile content of 50.0%) as a charge generator to prepare an oil ink for ink jet printer of 3% in pigment content. This ink had a zeta (ζ) potential of 47.9 mV (measured by LAZER ZEE METER Model 501 manufactured by Penchem Co., Ltd.), a particle diameter of 0.222 μm and a viscosity of 1.5 mPa·s. Furthermore, this ink was subjected to storage test for 14 days in a thermostat at 60° C. to find that the dispersion particle diameter was 0.223 μm, the viscosity was 1.5 mPa·s, no agglomeration occurred, and the ζ potential was 47.1 mV, and thus the ink had storage stability.

EXAMPLE 21

| | |
|---|---|
| Graft copolymer of Preparation Example 5 | 11.9 parts |
| Fastgen Blue TGR (copper-phthalocyanine blue pigment manufactured by Dainippon Ink & Chemicals Inc.) as particulate material | 5.7 parts |
| Solsperse 5000 as phthalocyanine pigment derivative | 0.3 part |
| KF-96L-1 (manufactured by Shin-Etsu Chemical Co., Ltd.) | 12.1 parts |
| Zirconia beads of 3 mm φ | 100 parts |

The above were weighed and charged in a plastic bottle of 100 cc and dispersed for 2 hours by a paint shaker (manufactured by Eishin Co., Ltd.), followed by adding thereto 25.0 parts of methyl ethyl ketone and 25.0 parts of KF-96L-1 and mixing them to obtain a dispersion slurry.

60.0 Parts of the resulting dispersion slurry was mixed with 7.5 parts of methyl ethyl ketone and 7.5 parts of KF-96L-1 to prepare a mixed solution.

Then, 75 parts of KF-96L-1 was weighed as a silicone solvent and charged in a beaker and stirred by a magnetic stirrer. Under stirring, said mixed solution was slowly added thereto dropwise to precipitate a graft copolymer on the surface of the particulate material.

After completion of the addition, methyl ethyl ketone was removed by vacuum distillation to obtain a dispersion composition having an amine value of 44.8 KOH mg/g and a pigment concentration of 4.6%. The resulting dispersion composition had a dispersion particle diameter of 0.138 μm (measured by a Laser Doppler type particle size distribution meter N4 PLUS manufactured by Kohlter Co., Ltd.). This dispersion composition was adjusted to 5% in nonvolatile matter concentration using KF-96L-1, and subjected to centrifugal force of 33500 G for 5 hours for measurement of the amount of the adsorbed resin by the centrifugal sedimentation from the nonvolatile content in the supernatant liquid to obtain an amount of the adsorbed resin of 88 parts based on 100 parts of the particulate material.

Furthermore, 64.7 parts of the above dispersion composition and 35.3 parts of KF-96L-1 were mixed to prepare an oil ink for ink jet printer having a pigment content of 3%. This ink had a zeta (ζ) potential of 17.9 mV (measured by LAZER ZEE METER Model 501 manufactured by Penchem Co., Ltd.), a particle diameter of 0.138 μm and a viscosity of 1.3 mPa·s. Moreover, this ink was subjected to storage test for 14 days in a thermostat at 60° C. to find that the dispersion particle diameter was 0.139 μm, the viscosity was 1.3 mPa·s, no agglomeration occurred, and the ζ potential was 17.1 mV and showed substantially no change, and thus the ink had markedly excellent storage stability.

COMPARATIVE EXAMPLE 5

A dispersion composition having an acid value of 11.3 KOH mg/g and a pigment concentration of 4.4% was obtained in the same manner as in Example 21, except that 12.3 parts of the graft copolymer of Preparation Example 13 was used in place of the graft copolymer of Preparation Example 5 used in Example 21 and the amount of KF-96L-1 solvent was reduced from 12.1 parts to 11.7 parts in the components to be dispersed by the paint shaker (manufactured by Eishin Co., Ltd.) for 2 hours. The resulting dispersion composition had a large dispersion particle diameter of 4.530 μm (measured by a Laser Doppler type particle size distribution meter N4 PLUS manufactured by Kohlter Co., Ltd.) and sedimented in several hours. Thus, this dispersion composition was inferior in stability to the composition of Example 21 and could not be used for oil inks for ink jet printers.

TABLE 2

Properties of dispersion composition

| | Pigment | Polymeric compound | Solvent | Acid value | Hydroxyl value | Amine value | Particle diameter (μm) | Adsorption amount |
|---|---|---|---|---|---|---|---|---|
| Example 1 | Blue TGR | Preparation Example 1 | KF-96L-1 | 11.1 | 33.2 | — | 0.194 | 99.5 |
| Comparative Example 1 | Blue TGR | Preparation Example 13 | KF-96L-1 | 0.2 | 28.5 | — | 4.525 | — |
| Example 2 | Blue TGR | Preparation Example 2 | KF-96L-1 | 0.3 | 28.2 | — | 0.229 | 99.2 |
| Example 3 | Blue TGR | Preparation Example 2 | Isopar G | 6.3 | 22.8 | — | 0.234 | 98.6 |
| Example 4 | Blue TGR | Preparation Example 3 | KF-995 | 59.8 | — | — | 0.156 | 89.5 |
| Example 5 | Blue TGR | Preparation Example 4 | KF-995 | 60.3 | — | — | 0.161 | 86.5 |
| Example 6 | Blue TGR | Preparation Example 1 | Isopar G | 25.2 | 19.4 | — | 0.186 | 99.1 |
| Example 7 | PINK EB trans | Preparation Example 1 | Isopar G | 8.9 | 34.5 | — | 0.192 | 99.4 |
| Comparative Example 2 | PINK EB trans | Sol 13940 (Zeneka Co.) | Isopar G | — | — | — | 0.256 | 11 |
| Example 8 | Yellow P-HG | Preparation Example 1 | Isopar G | 10.8 | 33.0 | — | 0.275 | 99.7 |
| Example 9 | #4000 | Preparation Example 1 | Isopar G | 12.5 | 32.1 | — | 0.168 | 99.6 |
| Example 10 | Same as in Example 7 | | | | | | | |
| Comparative Example 3 | Same as in Comparative Example 2 | | | | | | | |
| Example 11 | Blue TGR | Preparation Example 1 | KF-96L-1 | 18.5 | 24.3 | — | 0.185 | 29.3 |
| Example 12 | Blue TGR | Preparation Example 5 | Isopar G | — | — | 44.4 | 0.110 | 82 |
| Example 13 | Blue TGR | Preparation Example 6 | Isopar G | — | — | 118.9 | 0.132 | 87 |
| Example 14 | Blue TGR | Preparation Example 7 | Isopar G | — | — | 178.0 | 0.112 | 83 |
| Example 15 | Blue TGR | Preparation Example 8 | Isopar G | — | — | 43.2 | 0.160 | 53 |
| Example 16 | Blue TGR | Preparation Example 9 | Isopar G | — | — | 29.0 | 0.106 | 79 |
| Example 17 | Blue TGR | Preparation Example 1, 9 | Isopar G | — | 31.2 | 39.5 | 0.137 | 168 |
| Example 18 | Blue TGR | Preparation Example 12 | Isopar G | 26.5 | — | 41.1 | 0.204 | 304 |

TABLE 2-continued

Properties of dispersion composition

|  | Pigment | Polymeric compound | Solvent | Acid value | Hydroxyl value | Amine value | Particle diameter (μm) | Adsorption amount |
|---|---|---|---|---|---|---|---|---|
| Example 19 | Magenta RT-355-D | Preparation Example 6 | Isopar G | — | — | 119.9 | 0.263 | 79 |
| Comparative Example 4 | Magenta RT-355-D | Preparation Example 13 | Isopar G | 11.0 | — | — | 5.224 | — |
| Example 20 | Yellow HG | Preparation Example 6 | Isopar G | — | — | 119.3 | 0.222 | 79 |
| Example 21 | Blue TGR | Preparation Example 5 | KF-96L-1 | — | — | 44.8 | 0.138 | 88 |
| Comparative Example 5 | Blue TGR | Preparation Example 13 | KF-96L-1 | 11.3 | 11.3 | — | 4.530 | — |

TABLE 3

Properties of oil ink for ink jet printer

| | Properties of ink | | | After storage test | | |
|---|---|---|---|---|---|---|
| | Particle diameter*1 | Viscosity*2 | Zeta potential*3 | Particle diameter*1 | Viscosity*2 | Zeta potential*3 |
| Example 1 | 0.173 | 1.2 | 63.2 | 0.174 | 1.2 | 62.5 |
| Comparative Example 1 | | | Untested | | | |
| Example 2 | 0.227 | 1.2 | 83.7 | 0.225 | 1.2 | 82.1 |
| Example 3 | 0.228 | 1.4 | 53.1 | 0.225 | 1.4 | 52.8 |
| Example 4 | 0.148 | 6.8 | 19.7 | 0.149 | 6.7 | 18.7 |
| Example 5 | 0.155 | 6.7 | 18.3 | 0.161 | 6.7 | 18.8 |
| Example 6 | 0.183 | 1.4 | 75.4 | 0.179 | 1.4 | 76.1 |
| Example 7 | 0.189 | 1.4 | 48.5 | 0.191 | 1.3 | 48.0 |
| Comparative Example 2 | 0.252 | 1.5 | 8.0 | 0.292 | 2.0 | 6.0 |
| Example 8 | 0.277 | 1.4 | 45.3 | 0.268 | 1.4 | 46.1 |
| Example 9 | 0.163 | 1.4 | 46.4 | 0.159 | 1.4 | 45.2 |
| Example 10 | 0.191 | — | — | — | — | — |
| Comparative Example 3 | 0.453 | | | | | |
| Example 11 | 0.182 | 1.1 | 18.2 | 0.189 | 1.1 | 17.3 |
| Example 12 | 0.113 | 1.2 | 16.4 | 0.117 | 1.2 | 15.6 |
| Example 13 | 0.131 | 1.3 | 56.8 | 0.133 | 1.3 | 54.2 |
| Example 14 | 0.113 | 1.2 | 63.7 | 0.113 | 1.2 | 61.2 |
| Example 15 | 0.162 | 1.3 | 30.9 | 0.165 | 1.3 | 28.1 |
| Example 16 | 0.104 | 1.1 | 23.3 | 0.105 | 1.1 | 21.7 |
| Example 17 | 0.137 | 1.2 | 29.9 | 0.140 | 1.2 | 29.1 |
| Example 18 | 0.203 | 1.3 | 31.3 | 0.207 | 1.3 | 29.9 |
| Example 19 | 0.265 | 1.6 | 50.1 | 0.264 | 1.6 | 48.2 |
| Comparative Example 4 | | | Untested | | | |
| Example 20 | 0.222 | 1.5 | 47.9 | 0.223 | 1.5 | 47.1 |
| Example 21 | 0.138 | 1.3 | 17.9 | 0.139 | 1.3 | 17.1 |
| Comparative Example 5 | | | Untested | | | |

*1 Measured by Laser-Doppler type particle size distribution meter N4 PLUS manufactured by Kohlter Co., Ltd. (μm).
*2 Measured by R-type viscometer (100 rpm) manufactured by Toki Sangyo Co., Ltd. (mPa · s).
*3 Measured by LAZER ZEE METER Model 501 manufactured by Penchem Co., Ltd. (mV).

As explained above, the dispersion compositions of the present invention are enhanced in dispersion stability of particulate material to solve the problem of sedimentation, and, besides, can keep electric charge for a long period of time. Furthermore, the kind of usable organic solvents or insoluble particulate materials is expanded, and thus there can be provided dispersion compositions which are wide in utilization range and useful, particularly, for liquid developers using electrostatic force and jet inks.

What is claimed is:

1. A method for producing a dispersion composition which comprises (a) a step of dispersing a particulate material using a self-dispersing graft copolymer having a particle diameter of 0.01–1 μm in an organic solvent in which the graft copolymer is soluble and (b) a step of pouring an organic solvent in which the graft copolymer is insoluble into the dispersion obtained in the step (a) or pouring the dispersion obtained in the step (a) into an organic solvent in which the graft copolymer is insoluble, followed by mixing to precipitate the graft copolymer and to adsorb the graft copolymer to the particulate material.

2. A method according to claim 1, which additionally includes (c) a step of crosslinking and fixing the graft copolymer after the step (b) of adsorbing the graft copolymer to the particulate material.

3. A method according to claim 2, wherein the graft copolymer is crosslinked with a crosslinking agent comprising an amino resin or an epoxy resin.

4. A method according to claim 2, which additionally includes (d) a step of removing at least a part of the organic solvent after the step (c).

* * * * *